US006779577B1

(12) United States Patent
Kaneko et al.

(10) Patent No.: US 6,779,577 B1
(45) Date of Patent: Aug. 24, 2004

(54) BUILDING BOARDS, MANUFACTURING APPARATUS AND PREFOAMED PLASTICS

(75) Inventors: Shinichi Kaneko, Aichi (JP); Tomoyoshi Yabe, Aichi (JP)

(73) Assignee: Nichiha Corporation, Nagoya (JP)

(*) Notice: Subject to any disclaimer, the term of this patent is extended or adjusted under 35 U.S.C. 154(b) by 244 days.

(21) Appl. No.: 09/609,431

(22) Filed: Jun. 30, 2000

(30) Foreign Application Priority Data

| | | |
|---|---|---|
| Jun. 30, 1999 | (JP) | 11-185410 |
| Aug. 27, 1999 | (JP) | 11-242022 |
| Sep. 24, 1999 | (JP) | 11-271095 |

(51) Int. Cl.[7] .......................... B32B 13/00; B32B 13/12

(52) U.S. Cl. ........................ 156/543; 156/497; 156/510; 156/552; 156/556

(58) Field of Search ................................ 156/556, 497, 156/510, 552, 540, 541, 542, 543, 555, 346, 347, 348, 39, 40

(56) References Cited

U.S. PATENT DOCUMENTS

| | | | | |
|---|---|---|---|---|
| 4,031,282 A | | 6/1977 | McClinton | |
| 4,065,333 A | * | 12/1977 | Lawlis et al. | 156/154 |
| 5,264,057 A | * | 11/1993 | Schlatter et al. | 156/39 |
| 5,868,891 A | * | 2/1999 | Weir et al. | 156/230 |
| 6,145,257 A | * | 11/2000 | Cappuccio | 52/220.2 |
| 6,153,040 A | * | 11/2000 | Rohlf et al. | 156/281 |

FOREIGN PATENT DOCUMENTS

| | | | | |
|---|---|---|---|---|
| AU | 53620/99 | | 4/2000 | |
| DE | 3139053 | | 4/1983 | |
| FR | 2646865 | | 4/1990 | |
| GB | 1473308 | | 5/1977 | |
| JP | 51-123316 | | 3/1950 | |
| JP | 50-4173 | | 1/1975 | |
| JP | 53-14727 | | 2/1978 | |
| JP | 53059225 | | 5/1978 | |
| JP | 53-147785 | | 12/1978 | |
| JP | 56-17262 | | 2/1981 | |
| JP | 56-17263 | | 2/1981 | |
| JP | 59-73484 | | 4/1984 | |
| JP | 59-97586 | | 6/1984 | |
| JP | 60-67144 | | 4/1985 | |
| JP | 7195344 | A | 8/1985 | |
| JP | 61-57742 | | 3/1986 | |
| JP | 1-77528 | | 3/1989 | |
| JP | 64-079083 | A * | 3/1989 | C04B/41/62 |
| JP | 1-127330 | | 5/1989 | |
| JP | 58-164885 | | 9/1989 | |
| JP | 1308622 | | 12/1989 | |
| JP | 2-58670 | | 2/1990 | |
| JP | 7-48915 | | 2/1995 | |
| JP | 8319360 | A | 12/1996 | |
| JP | 10157006 | | 6/1998 | |
| JP | 11171667 | A | 6/1999 | |
| SU | 721379 | | 3/1980 | |

* cited by examiner

*Primary Examiner*—Sue A. Purvis
(74) *Attorney, Agent, or Firm*—Shook, Hardy & Bacon LLP

(57) ABSTRACT

A building board comprising a cement substrate, a top coated layer formed on the front surface of the substrate, and a plastic sheet formed on the back surface of the substrate. The plastic sheet should preferably be formed of a polyethylene sheet. Since the impregnation of water from the back surface of building board can be effectively prevented, the change in dimension of board as a whole can be minimized.

10 Claims, 42 Drawing Sheets

FIG.22A

| CONTENTS OF OPERATION | OBJECTS AND CONTENTS OF CONTROL |
|---|---|
| 1. CART CC ARRIVED AT POSITION (1) | CART-DRIVING MOTOR 143, HALT |
| 2. MOVE BOARD "a" TO POSITION (1) | CHAIN CONVEYOR 171, DRIVE |
| 3. BOARD "a" IS SET ON CART CC UNDER HALTED STATE | SINGLE-ACTING AIR CYLINDER 161, SOLENOID VALVE ON |
| 4. CART CC IS RAISED UP TO UPPER CHAIN CONVEYOR 172 | LIFTER (1) L,R 173, UP → DOWN (USING LIMIT SWITCH) |
| 5. CART CC FROM POSITION (1) IS MOUNTED ON MOVING CHAIN CONVEYOR 172 | PUSHER A174, ADVANCED → RETRACTED |
| 6. CART CC IS MOVED TO POSITION (2) | CHAIN CONVEYOR 172, DRIVE (USING LIMIT SWITCH) |
| 7. CART CC IS PLACED ON PASSAGEWAY 151 | LIFTER (2) L,R 175, DOWN → UP (USING LIMIT SWITCH) |

FIG.22B

| | |
|---|---|
| 8. CART CC IS MOVED FROM POSITION (2) TO POSITION (3) | CART-DRIVING MOTOR 143, NORMAL ROTATION, ACCELERATED → CONST. → DECELERATED → HALT |
| 9. BOARD "a" IS PLACED ON ROLLER 126 FROM CART CC | RACK GEAR 154 OF HANGER 148, DRIVE; SINGLE-ACTING AIR CYLINDER 161, SOLENOID VALVE OFF |
| 10. BOARD "a" IS DELIVERED | ROLLER 126, OPERATION → SUSPENSION |
| 11. CART CC IS RAISED UP TO UPPER CHAIN CONVEYOR 176 | LIFTER (3) L,R177, UP → DOWN (USING LIMIT SWITCH) |
| 12. CART CC FROM POSITION (3) IS MOUNTED ON MOVING CHAIN CONVEYOR 176 | PUSHER B178, ADVANCED → RETRACTED |
| 13. CART CC IS MOVED TO POSITION (4) | CHAIN CONVEYOR 176, DRIVE (USING LIMIT SWITCH) |
| 14. CART CC IS PLACED ON PASSAGEWAY 151 | LIFTER (4) L,R 179, DOWN → UP (USING LIMIT SWITCH) |
| 15. CART CC IS MOVED FROM POSITION (4) TO POSITION (1) | CART-DRIVING MOTOR 143, REVERSE ROTATION, ACCELERATED → CONST. → DECELERATED → HALT |
| 16. RETURN TO OPERATION NO 1 | |

FIG.33

| CORNER (1) | | CORNER (2) | | CORNER (3) | | CORNER (4) | |
|---|---|---|---|---|---|---|---|
| 10:00 | ID1 | 10:07 | ID1 | 10:20 | ID1 | 10:27 | ID1 |
| 10:05 | ID2 | 10:12 | ID2 | 10:25 | ID2 | 10:32 | ID2 |
| 10:10 | ID3 | 10:17 | ID3 | 10:30 | ID3 | 10:37 | ID3 |
| 10:15 | ID4 | 10:22 | ID4 | 10:35 | ID4 | 10:42 | ID4 |
| 10:20 | ID5 | 10:27 | ID5 | 10:40 | ID5 | 10:47 | ID5 |
| 10:25 | ID6 | 10:32 | ID6 | 10:45 | ID6 | 10:52 | ID6 |
| 10:30 | ID7 | 10:37 | ID7 | 10:50 | ID7 | 10:57 | ID7 |
| 10:35 | ID8 | 10:42 | ID8 | 10:55 | ID8 | 11:02 | ID8 |
| 10:40 | ID1 | 10:47 | ID1 | 11:00 | ID1 | 11:07 | ID1 |
| 10:45 | ID2 | 10:52 | ID2 | 11:05 | ID2 | 11:12 | ID2 |
| 10:50 | ID3 | 10:57 | ID3 | 11:10 | ID3 | 11:17 | ID3 |
| ⋮ | ⋮ | ⋮ | ⋮ | ⋮ | ⋮ | ⋮ | ⋮ |

BUILDING BOARDS, MANUFACTURING APPARATUS AND PREFOAMED PLASTICS

BACKGROUND OF THE INVENTION

1. Field of the Invention

The present invention relates to a building board which is suited for use for constituting the external wall of building, in particular, building board whose back surface is improved in waterproof property. The present invention also relates to a manufacturing apparatus for such a building board and to a prefoamed plastics.

2. Description of the Related Arts

FIG. 1 illustrates a flow chart for explaining a continuous coating process of a building board according to the prior art. Namely, this continuous coating process involves the steps of: introducing, as a raw substrate, a cement substrate at first into the coating line (step S1); forming a back-coating by the coating of a back sealer on the rear surface of the cement substrate by means of a roll coater (step S2); drying that (1) (step S3); forming a under coating by the spraying of a sealer all over the top surface of the cement substrate (step S4); drying that (2) (step S5); forming an intermediate coating by the spraying of a color paint whose color is the same as that of the concave portions all over the top surface of the substrate (step S6); drying that (3) (step S7); forming a top coating by the coating of a paint on the concave portions of the substrate (step S8); drying that (4) (step S9); applying a decorative coating, if desired, by means of sputtering for instance (step S10); performing a clear coating by the spraying of a clear point all over the top surface of the substrate(step S11); drying that (5) (step S12); cooling that coated layers by air cooling (step S13); performing the inspection of the finished building board (step S14); packing the finished building board (step S15); and shipping the package, thus completing the flow.

As shown in FIG. 1, in order to provide the rear surface of the substrate or building board with a waterproofness of some degree, a back sealer coating is performed in the beginning of the coating process. The coating weight in this case is about 45–55 $g/m^2$ in the wet state, and the thickness of the sealer after drying is about 10–20 $\mu$m. Since the sealer is applied to the porous back surface of the cement substrate, the thickness of the sealer is ultimately thinned by the amount that has been impregnated into the porous interior of the substrate.

The term "sealer" herein means a paint to be employed for the purpose of filling the pores existing on a porous and absorptive coating surface with the paint. For this purpose, a colorless and transparent acrylic urethane-based paint is extensively employed.

The back surface of cement substrate (i.e. a board not coated with a paint) that can be manufactured in the ordinary manufacturing line is approximately flat, but is actually accompanied with minute projected and recessed portions as well as a large number of voids as a whole, so that the density of board in the thickness-wise direction thereof is not necessarily uniform.

Therefore, it is difficult, in the back sealer-coating step of the continuous coating process of building boards, to avoid the generation of partial non-uniformity of coating on a sealer-permeable surface. If such a non-uniformity of coating is generated, it becomes impossible to expect a sufficient waterproofness as desired of the building board.

However, it is not necessarily appropriate, for the reason of inviting a substantial increase in manufacturing cost, to increase the quantity of the sealer to be applied to the back surface of the building board which portion is usually hidden from one's eyes.

The coating of sealer has been conventionally performed with a view that, since the sealer coated on back surface is not directly exposed to rain fall in contrast to the coated layer formed on the front surface of building board, it would be sufficient as the function of the sealer layer if it can provide the back surface of substrate with some degree of waterproofness. Therefore, a little attention has been paid on other physical properties such as scratch resistance, and hence, the layer of sealer that has been conventionally applied to the back surface of substrate is not necessarily sufficient enough in terms of mechanical strength.

Due to such a conventional thinking, there has been much possibility that scratching may be accidentally generated in the layer of sealer during the transportation or attaching operation of the building boards. If scratching is happened to be generated in the layer of sealer, it is no more possible to prevent the permeation of water through such a scratched portion. There is also a possibility that a fatal defect such as the breakage of rabbet portion of building board may be generated due to a shock given to the building board.

SUMMARY OP THE INVENTION

The present invention has been accomplished under the aforementioned circumstances, and therefore an object of the present invention is to provide a building board which can be easily and reliably manufactured without necessitating the step of coating a back sealer and a drying step to be followed, and which is capable of effectively exhibiting an excellent waterproofness which has been conventionally aimed at by the layer of sealer formed on the back surface of building board. Other objects of the present invention are to provide a manufacturing apparatus for such a building board and to a prefoamed plastics to be employed for the manufacture of such a building board.

Namely, the building board proposed by the present invention is featured in that a ground of cement substrate is backed with a plastic sheet.

When the plastic sheet is printed with a pattern, it is possible to provide the back surface of building board with a sort of design, thus making it useful in the manufacture of a simplified facing.

When the plastic sheet is formed of a polyethylene sheet, the cost for the plastic sheet can be saved, and even if the polyethylene sheet is burnt, it is simply melted without generating smoke, and the products to be generated by the combustion thereof are limited to water and carbon dioxide, giving no harm to lives.

When the polyethylene sheet having a density ranging from 0.910 to 0.925 $g/cm^3$ is employed, it is possible to obtain excellent properties in terms of transparency, formability, heat adhesiveness, extensibility and impact strength.

Further, when the polyethylene sheet having a thickness ranging from 0.07 to 0.30 mm is employed, it is possible to obtain excellent results in terms of strength, waterproofness and adhesivity to the back surface of the cement substrate.

On the other hand, a feature of the building board manufacturing apparatus proposed by the present invention is in that it is provided with a backing means to thermally adhere the plastic sheet to the ground of cement substrate, thus backing the cement substrate.

When the backing means is designed to perform the backing of a building board in subsequent to a clear coating, it is possible to utilize the heated temperature of the building board being transferred, thus dispensing after that with a high-temperature heating step for the plastic sheet, thereby making it possible to prevent the plastic sheet from being damaged in the heating step.

A feature of the building board proposed by the present invention is in that a ground of cement substrate is backed with a foamed plastic sheet.

When the foamed plastic sheet is formed, as a main component, of polyethylene, it is possible to provide a building board which is especially excellent in low temperature properties, flexibility and toughness.

Further, when the foamed plastic sheet having a thickness ranging from 0.5 to 3.0 mm is formed, it is possible to provide the plastic sheet which is excellent in strength and shape.

Furthermore, a feature of the building board manufacturing apparatus proposed by the present invention is in that it is provided with a backing means to perform the backing of the ground of cement substrate with a foamed plastic during the foam molding of an expandable plastic, thereby making it possible to obtain an excellent adhesion property of the building board.

When the backing means is designed to perform the backing of a building board in subsequent to a clear coating, it is possible to utilize the heated temperature of the building board being transferred for the foaming treatment of the expandable plastic, thus dispensing after that with a high-temperature heating step for the foamed plastic, thereby making it possible to prevent the foamed plastic from being damaged in the heating step.

There is also provided by the present invention a prefoamed plastics comprising a plastic sheet on which un-foamed plastics shaped like an island having approximately the same configuration and size as those of a building board is laminated at intervals and sequentially. When the prefoamed plastics is formed in this manner, the prefoamed plastics to be employed for backing a building board can be effectively utilized without being wasted.

Further, when the plastic sheet is formed, as a main component, of PET (polyethylene terephthalate), and the un-foamed plastics is formed, as a main component, of polyethylene, it is possible to provide a building board which is harmless and especially excellent in low temperature properties, flexibility and toughness.

The building board according to the present invention comprises a ground of cement substrate which is backed with a foamed plastic layer and a non-foamed plastic layer, the non-foamed plastic layer being disposed to constitute an outermost layer.

When the foamed plastic layer is formed, as a main component, of polyethylene, it is possible to provide a building board which is especially excellent in low temperature properties, flexibility and toughness.

Further, when the foamed plastic layer having a thickness ranging from 0.5 to 3.0 mm is formed, it is possible to provide the plastic sheet which is excellent in strength and shape.

Further, when the non-foamed plastic layer is formed, as a main component, of PET (polyethylene terephthalate), it is possible to provide a building board which is harmless and especially excellent in low temperature properties, flexibility and toughness.

Additionally, another feature of the building board manufacturing apparatus proposed by the present invention is that it is provided with a backing means which is designed to laminate a foamed plastic layer and a non-foamed plastic layer on a ground of cement substrate so as to back the cement substrate in such a manner that the non-foamed plastic layer becomes an outermost layer at the step of foam-molding the expandable plastic layer on the non-foamed plastic layer.

When the backing means is designed to perform the backing of a building board in subsequent to a clear coating, it is possible to utilize the heated temperature of the building board being transferred for the foaming treatment of the expandable plastic, thus dispensing with a high-temperature heating step for the foamed plastic, thereby making it possible to prevent the plastic layer from being damaged in the heating step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 22 is a diagram illustrating the control items of the sequential operation executed in the entire transferring system of the carriage cart CC shown in FIG. 21;

FIG. 33 is an example of table showing the movement created in step S121;

DESCRIPTION OF THE PREFERRED EMBODIMENTS

Preferable embodiments of the present invention will be explained in detail with reference to the drawings.

A First Embodiment

Figure 2:
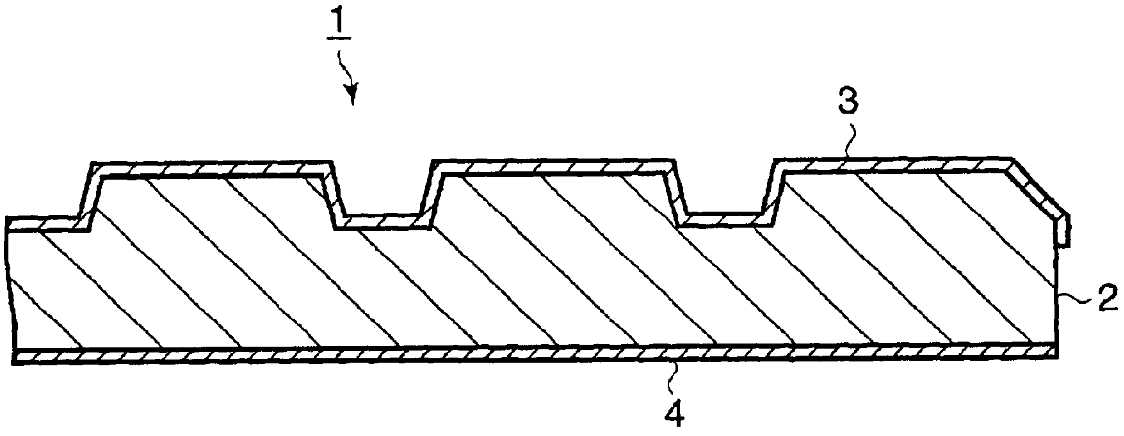
FIG. 2 is a partial cross-sectional view illustrating the construction of a building board according to the first embodiment.

FIG. 2 is a partial cross-sectional view illustrating the construction of a building board according to the first embodiment of the present invention. Referring to FIG. 2, a building board 1 is composed of a cement substrate 2, a front surface coating layer 3 formed on the front surface of the substrate 2, and a backing layer consisting of a plastic sheet, preferably a polyethylene sheet 4 which is formed on the back surface of the substrate 2. The cement substrate 2 can be manufactured by a process wherein a raw mat is prepared at first through the forming of a raw slurry on a porous substrate by means of paper-making or extrusion of the raw slurry, and the resultant composite is pressed and cured.

The raw slurry is a water dispersion containing generally 5 to 20% by weight of solid matters comprising an inorganic hydraulic cement-based material selected from the group consisting of Portland cement, a blast furnace cement composed of Portland cement and blast furnace slag, a fly ash cement containing fly ash, a silica cement containing silicic substance such as volcanic ash, silica fume and clay, an alumina cement, a blast furnace slag, etc.; a ligneous reinforcing material selected from the group consisting of wood flour, excelsior, chipping, woody fiber, woody pulp, softwood pulp, hard-wood pulp, ligneous fiber bundle, waste-paper pulp, hemp fiber, bagasse, rice hull, rice straw, bamboo fiber, etc.; and optionally, other additives such as an aggregate selected from the group consisting of perlite, cirrus balloon, expanded shale, expanded clay, sintered diatomaceous earth, fly ash, coal cinders and pulverized foamed concrete, an accelerator such as alkaline metal silicate, and a waterproofing agent or a water repellent such as wax, paraffin, a surfactant and silicone.

When a high-pressure-processed polyethylene having a density ranging from 0.910 to 0.925 $g/cm^3$ is employed as the polyethylene sheet 4 for the backing, it is possible to obtain excellent properties in terms of transparency, formability, heat adhesiveness, extensibility and impact strength. The thickness of the polyethylene sheet 4 should preferably be in the range of 0.07 to 0.30 mm, more preferably in the range of 0.10 to 0.20 mm. Because, if the thickness of the polyethylene sheet 4 is less than 0.07 mm, it may raise a problem in terms of strength thereof and also may become impossible to expect a sufficient waterproofness. On the contrary, if the thickness of the polyethylene sheet 4 exceeds over 0.30 mm, the rigidity of the sheet may become excessively high, so that it may raise a problem at the occasion of bonding it to the back surface of the cement substrate 2.

In the case of this first embodiment, the backing work of the polyethylene sheet 4 is scheduled to be performed immediately after the drying step (5) (step S12) following the clear coating step (step S11) in the continuous coating process. The reason for this is to utilize the temperature of heated work board (board to be worked, the same hereinafter) being transferred for the thermal adhesion of the polyethylene sheet.

Although the drying step subsequent to the clear coating is generally performed by a heating treatment of 10 to 12 minutes at a temperature of about 90 to 120° C., the drying step according to this first embodiment will be performed by controlling the temperature of the work board depending on the physical properties (in particular, the softening point and melting point are important) of polyethylene to be employed and on the bonding conditions related to such physical properties.

Figure 3:
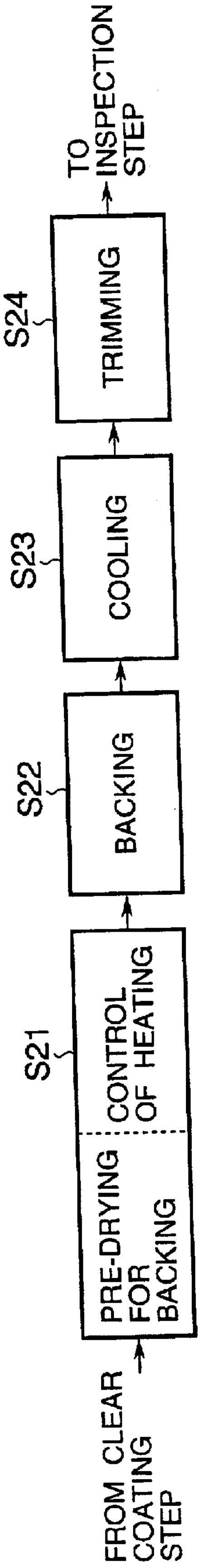
FIG. 3 is a process chart for illustrating a back-working process of a polyethylene sheet according to the first embodiment.

FIG. 3 shows a flow process for illustrating a back-working process of a polyethylene sheet according to this first embodiment. The heat treatment conditions of the final chamber inside a dryer are controlled (step S21), while measuring the temperature of the work board (surface temperature) by means of a non-contact surface thermometer at the outlet port of the dryer of the drying step (5) (step S12 in FIG. 1) following the clear coating step (step S11). For example, it will be controlled such that the temperature of the work board immediately after being transferred out of the dryer is maintained at 140±2° C., and that the work board heated at this temperature is immediately subjected to a thermal press adhesion (hold it for 5 seconds at a clipping pressure of 330±50 kg/m$^2$) (step S22). Thereafter, the polyethylene sheet is immediately quenched to about 90° C. thus allowing it to solidify, and then, transferred to the next cooling step (air cooling) (step S23). Thereafter, the work board is transferred, via a trimming step (step S24) where a superfluous portion of the polyethylene sheet which is protruded outside the outline of the work board is cut off or trimmed, to the inspection step (step S14). Due to these steps, the conventional back coating step (step S2) as well as the next drying step (1) (step S3) can be dispensed with.

Figure 4:
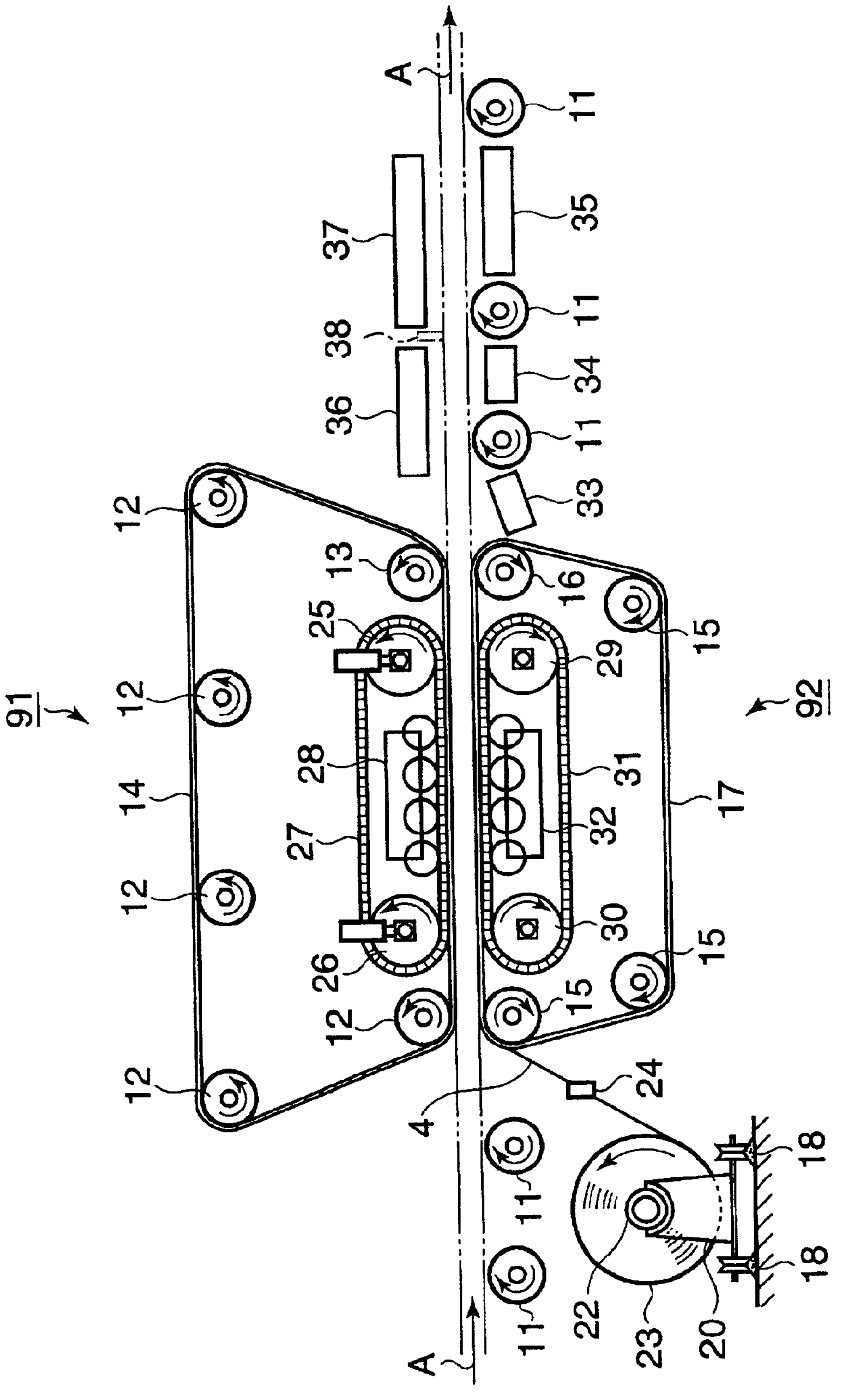
FIG. 4 is a side view illustrating the construction of a back-working apparatus for performing a polyethylene sheet backing.

FIG. 4 shows a side view illustrating the construction of a back-working apparatus for performing a polyethylene sheet backing according to the first embodiment of the present invention. In this first embodiment, a heat bonding system is adopted as a bonding system of the polyethylene sheet 4 to the substrate. Specifically, a work board which is heated at a constant temperature higher than the thermal adhesion temperature of polyethylene sheet 4 is utilized as a heating element for the polyethylene sheet 4. Namely, the work board acting as a heating element is directly press-contacted with the polyethylene sheet 4 so as to adhere thermally the polyethylene sheet 4 to the work board by way of heat conduction. According to this bonding system, it is possible to raise the temperature of the core portion of the polyethylene sheet 4 up to about 90% of temperature of contacted heating element within about 0.9 second when the thickness of the polyethylene sheet 4 is 0.10 mm.

As shown in FIG. 4, this back-working apparatus is generally constituted by two zones, i.e. an upper zone where an upper side device portion 91 is located, and a lower zone where a lower side device portion 92 is located, with the moving line of the work board being interposed therebetween. In this case, the work board is transferred by a transferring roll 11 in the direction of the arrow A.

It is generally required, for the purpose of pressing for bonding, to provide a structure which is capable of applying an appropriate pressure to the bonding surface, and also capable of maintaining this appropriate pressure until a predetermined bonding strength can be obtained. However, in the case of this first embodiment, it is only required to adhere thermally a thin polyethylene sheet 4, but is required to take a special working process wherein the work boards that are being intermittently transferred are required to be treated one by one. Due to such a circumstance, a special continuous pressing system as shown in FIG. 4 is adopted for press-clamping the polyethylene sheet 4.

More specifically, the upper side device portion 91 is provided with an upper endless belt 14 which is designed to be rotated by means of a belt-rotated roll 12 and an upper feed roll 13. Additionally, the upper side device portion 91 is further provided with a steel belt 27 which is designed to be rotated by means of a fore main press roll 25 and a rear main press roll 26, and with a row of auxiliary press rolls 28. In this case, the work boards are designed to be moved forward, while being press-clamped, by the movement of the steel belt 27 and the upper endless belt 14, which are designed to be actuated by the fore main press roll 25, the rear main press roll 26 and the row of auxiliary press rolls 28. As explained above, a caterpillar press system employing the steel belt 27 is adopted as a basic system for the press-clamping.

Further, by taking into consideration the fact that the work board is lengthy, the row of auxiliary press rolls 28 is also employed in addition to the fore main press roll 25 and the rear main press roll 26. In this case, since a projected and recessed pattern is formed in most cases on the surface of the work board to be employed as the building board 1, the upper side device portion 91 is designed to apply a pressure to the front surface side of the work board through the upper endless belt 14 made of a heat-insulating elastic sheet (for example, a flame-retardant foamed plastic sheet) having a predetermined thickness.

On the other hand, the lower side device portion 92 is also provided with a belt-rotated roll 15, a lower feed roll 16, a lower endless belt 17, a fore main back-up roll 29, a rear main back-up roll 30, a steel belt 31, and a row of auxiliary back-up rolls 32. In this case, by means of the lower endless belt 17 which is disposed to face the upper endless belt 14 with a predetermined clearance (to be determined depending on the thickness of work board) being interposed therebetween, the work board is supported through the back surface thereof and moved forward in a press-clamped manner. On this occasion, since the polyethylene sheet 4 is to be softened and melted by the heat from the work board, a release sheet such as a silicone rubber sheet is employed as the lower endless belt 17 for supporting the back surface of the work board.

Figure 5:
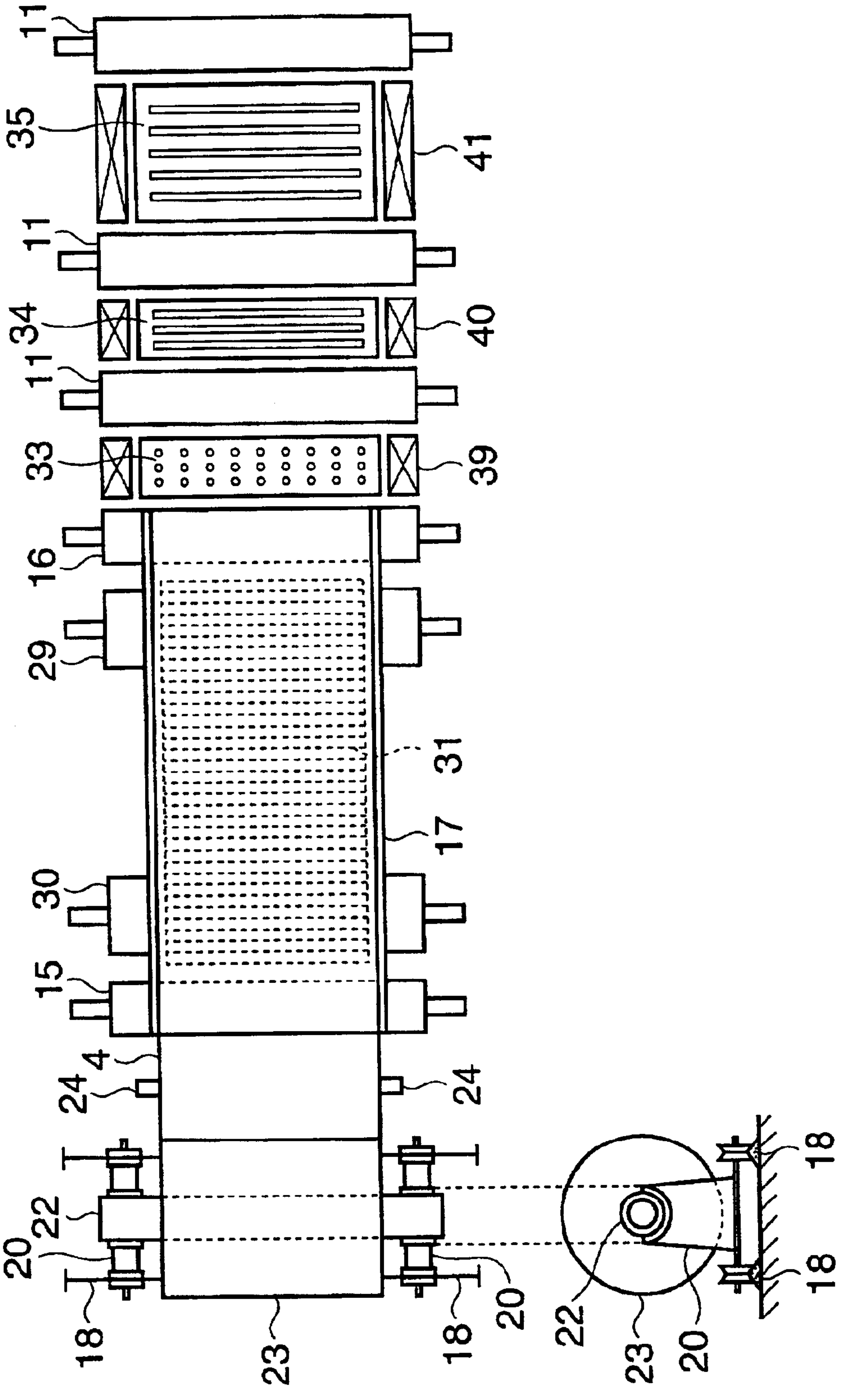
FIG. 5 is a plan view illustrating the construction of a lower side device portion of back-working apparatus.

FIG. 5 is a plan view illustrating the construction of a lower side device portion of back-working apparatus according to the first embodiment of the present invention. Referring to FIG. 5, for the purpose of solidifying the polyethylene sheet 4, the work board that has been transferred just out of the backing step(step S22 in FIG. 3), thus accomplishing the backing of the work board with the polyethylene sheet 4, is immediately subjected to a quenching treatment of the back surface thereof at a first cooling zone 33 as a cooling step (step S23 in FIG. 3), which is successively followed by cooling steps at a second cooling zone 34 and a third cooling zone 35. Additionally, although this cooling step is mainly intended to cool the back surface or sheet-bonded surface of the work board, it is also required to remove more or less the heat retained inside the work board (i.e. the cement type building board is heat-accumulative), so that a cool air blowing is also performed against the surface of the work board at a fourth cooling zone 36 and a fifth cooling zone 37 (see FIG. 4).

In this case, the first cooling zone 33 is designed such that a compressed air is ejected from nozzles (for example, it is ejected at a flow rate of 2 kg/cm$^2$) and blown against the softened or melted film attached to the back surface of the work board. More specifically, a nozzle array wherein a plurality of sector-shaped nozzles are arranged at predetermined intervals is arranged in multiple and back and forth, so that an air blow is enabled to be successively directed to the work board being moved forward, starting from the moment when the work board is just transferred out of the lower endless belt 17.

The second, third, fourth and fifth cooling zones 34, 35, 36 and 37 are designed to blow a cool air supplied through a cooler duct against the work board by making use of a hood provided with a blow-out slit for ejecting the cool air. The cool air that has been heat-exchanged at the front and back surfaces of the work board is recovered for the purpose of recycling it by a plurality of recovering ducts 39, 40 and 41 disposed on both sides of the cooling zones.

Figure 1:
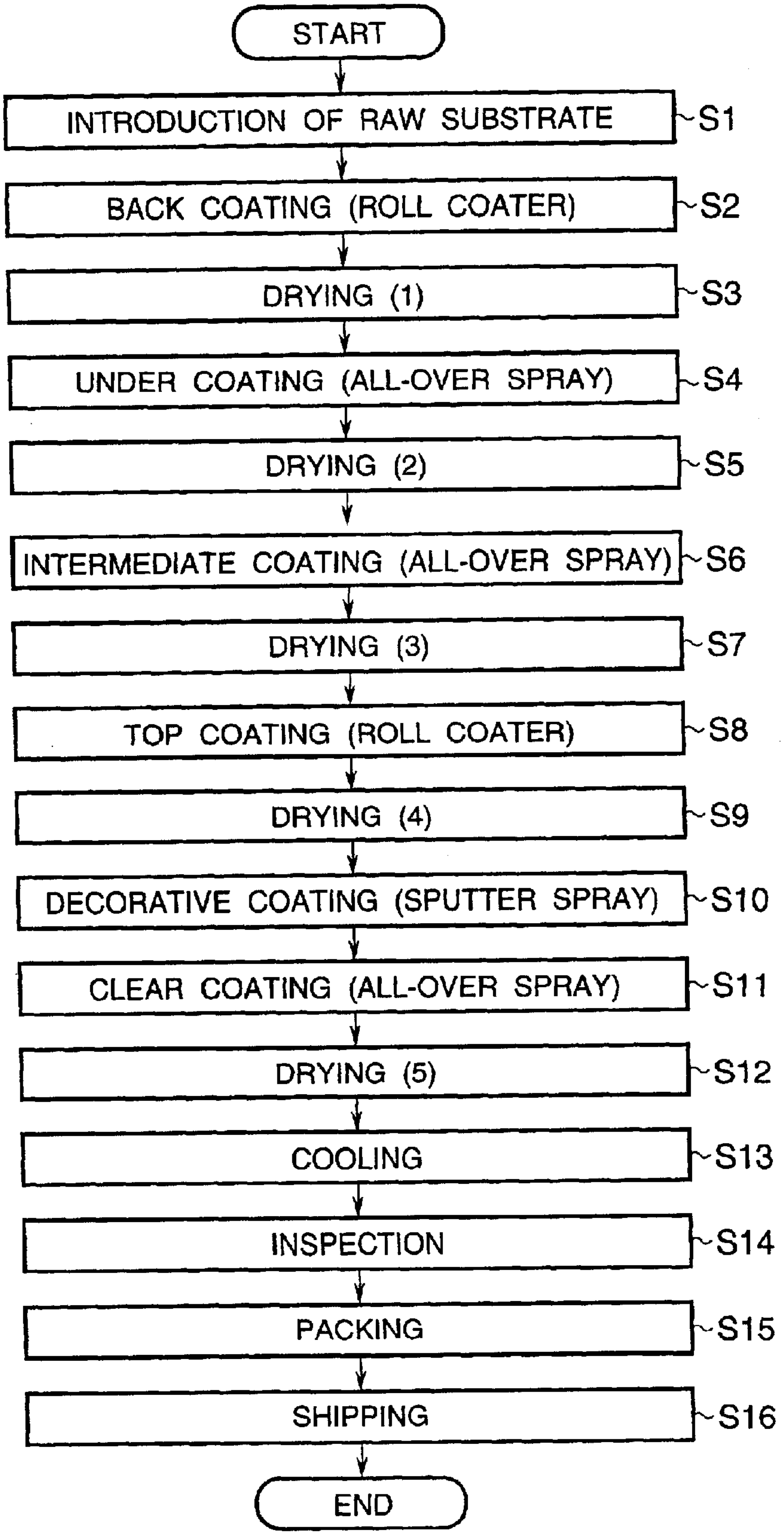
FIG. 1 is a process chart for illustrating a continuous coating process of a building board of the prior art.

Then, the work board is advanced to the conventional cooling step (step S13 in FIG. 1) wherein the work board is subjected to a cooling-down for a prescribed period of time by making use of the conventional wicket conveyor for instance (see Japanese Patent Unexamined Publication H5-208728), after which the work board is further advanced to the board-inspecting step (step S14 in FIG. 1).

Next, there will be explained about the controlling of driving of polyethylene sheet roll 23.

As shown in FIGS. 4 and 5, the sheet roll 23 of polyethylene sheet which is wound around a paper tube is adapted to be set on a roll-mounting carriage 20 which is designed to support the both end portions of a supporting bar 22 that has been inserted into the paper tube. This roll-mounting carriage 20 is designed to be controlled in such a manner that it can be moved right and left on a rail 18. By controlling the roll-mounting carriage 20 in this manner, it becomes possible to prevent the polyethylene sheet 4 from being meandered during the operation, thus making it possible to move the polyethylene sheet 4 along a fixed position. More specifically, the both end portions of the polyethylene sheet 4 are detected at first by detectors 24, on the basis of which the driving motor (pulse motor for instance) 82 of the roll-mounting carriage 20 (see FIG. 7) is controlled so as to adjust the magnitude of shifting rightward or leftward of the roll-mounting carriage 20.

In this case, although the sheet roll 23 is pulled due to the movement of the lower side endless belt 17, the rotation of the sheet roll 23 is designed to be controlled by a driving motor 83 (see FIG. 7) which is mounted to assist the delivery of the polyethylene sheet 4.

According to this first embodiment, each of the lengthy work boards that are being fed intermittently is required to be successively subjected to a laminating work of polyethylene sheet 4. Therefore, the explanation of how to intermittently feed the polyethylene sheet 4 at the lower side device portion 92 will be set forth below.

Referring to FIG. 4, when the rear end portion of the work board has passed through the lower feed roll 16 which is disposed prior to the fore main back-up roll 29, the portion of the polyethylene sheet 4 that has been quenched at the aforementioned first cooling zone 33 is still connected with the sheet roll 23. Thus, the polyethylene sheet 4 is cut off immediately after the rear end portion of the work board has passed through the second and fourth cooling portions 34 and 36 (at this stage, the polyethylene sheet 4 is completely solidified) by making use of a laser knife 38 (for example, CO2 laser knife).

After the polyethylene sheet 4 is cut off, a couple of the endless belts 17 and 31 of the lower side device portion 92 are stopped, and the driving motor 83 actuating the sheet roll 23 in the normal direction is caused to rotate in the reverse direction so as to wind up the polyethylene sheet 4 until the leading end of the polyethylene sheet 4 is pulled back to the position just in front of the rear main back-up roll 30. Thereafter, when the leading end of the next work board is transferred to a prescribed position in front of the rear main back-up roll 30, the operation of this couple of the endless belts 17 and 31 that have been stopped so far is resumed so as to rerotate the sheet roll 23 in the normal direction. On this occasion, since a predetermined clearance is retained as mentioned above between the upper side device portion 91 and the lower side device portion 92, the operation of this couple of the endless belts 17 and 31 may not be temporarily stopped. However, since these endless belts 17 and 31 are not required to be operated at this moment, the suspension of the operation of these endless belts 17 and 31 is not meaningless. Further, it may be preferable to actuate the endless belts 14 and 27 of the upper side device portion 92 in conformity with the lower side device portion 91.

Figure 6A:
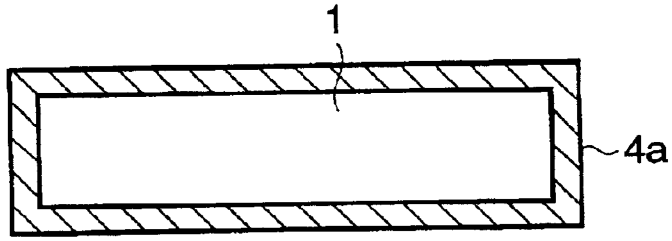
FIG. 6 shows schematic views illustrating a trimming process in FIG. 8.
Figure 6B:
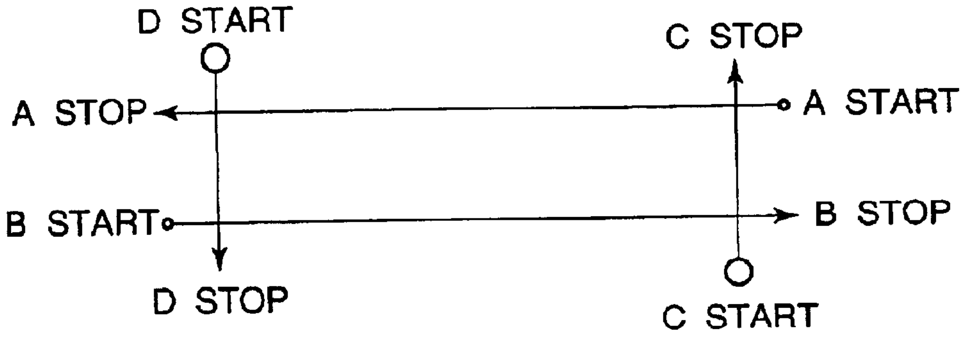
Figure 6C:
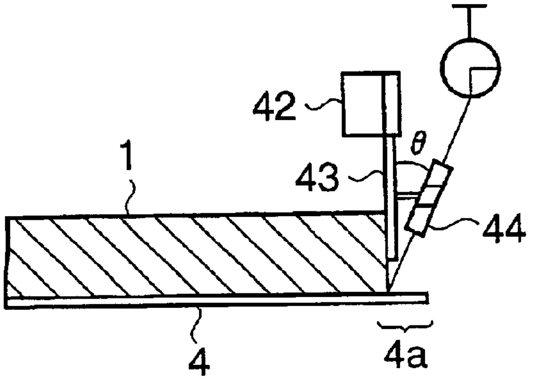

FIG. 6 illustrates a trimming method in the first embodiment of the present invention. As shown in FIG. 6(*a*), after finishing the laminating process and the cooling down treatment, the building board 1 is required to be trimmed, since a superfluous portion of the polyethylene sheet 4*a* is protruded out of the outline of the building board 1. In such a case, as shown in FIG. 6(*c*), a laser knife holder plate 43 attached to the slider of the lower surface guider 42 is actuated to move along the perpendicular wall portion on the outline of the building board 1 by taking advantage of this perpendicular wall portion as a guider. This laser knife holder plate 43 is provided with a laser knife 44 which is inclined at a predetermined angle θ.

In the embodiment shown in FIG. 6(*b*), the building board 1 is stopped at a fixed position, and, under this condition, the trimming of four sides of the building board 1 is accomplished by simultaneously moving four laser knives in the direction as indicated by the arrows (two for trimming the right and left sides in the longitudinal direction (A, B); and two for trimming the fore and rear sides in the direction perpendicular to the longitudinal direction (C, D)). When the next building board 1 has subsequently reached this same trimming position, the laser knives 44 are actuated to move starting from this existing stopped position in the direction opposite to the arrows, thus executing the trimming of four sides.

Figure 7:
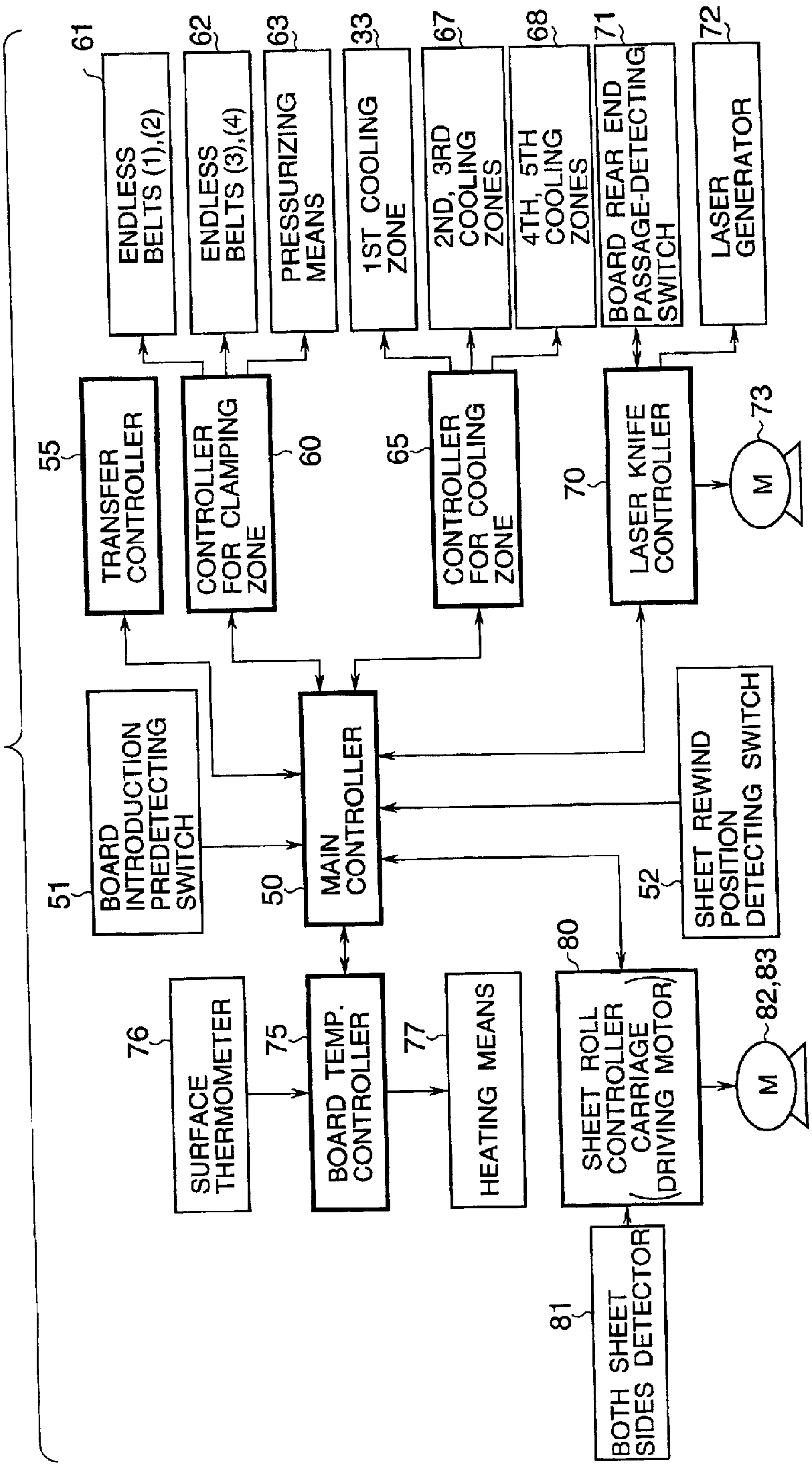
FIG. 7 is a block diagram illustrating the entire control system for a polyethylene sheet-backing work shown in FIG. 7.

FIG. 7 shows a block diagram illustrating the entire control system for a polyethylene sheet-backing work in the first embodiment of the present invention. A unified control of each controller is performed by the main controller 50. The transfer controller 55 performs to control the transferring of work boards. The controller for clamping 60 performs to control the operation of the endless belt 14 and the steel belt 27 as endless belts (1) (2) 61, to control the operation of the endless belt 17 and the steel belt 31 as endless belts (3) (4) 62, and to control a pressurizing means 63 through the fore main press roll 25, the rear main press roll 26 and the row of auxiliary press rolls 28. In this case, the endless belt 14 and the steel belt 27 are controlled so as to be operated at the same speed with each other, while the endless belt 17 and the steel belt 31 are also controlled so as to be operated at the same speed with each other. The controller for cooling zone 65 performs to control the first cooling zone 33, and to control the second cooling zone 34 and the third cooling zone 35 functioning as "the second and third cooling zones" 67, and to control the fourth cooling zone 36 and the fifth cooling zone 37 functioning as "the fourth and fifth cooling zones" 68. In this case, the second cooling zone 34 and the third cooling zone 35 may be preferably controlled so as to make them the same in cooling magnitude with each other, while the fourth cooling zone 36 and the fifth cooling zone 37 also may be preferably controlled so as to make them the same in cooling magnitude with each other. The laser knife controller 70 performs, upon detecting the passage of the rear end of the work board through the second and fourth cooling zones 34 and 36 by means of a board rear end passage-detecting switch 71, to emit a laser beam from the laser generater 72 and to actuate the laser knife 38 to traverse the polyethylene sheet 4 by means of a motor 73, thereby cutting off the polyethylene sheet 4, When the introduction of a work board is detected by a board introduction-predetecting switch 51, the temperature (surface temperature) of the work board at the outlet port of dryer is measured by a non-contact type surface thermometer 76 in the drying step (5) (step S12 in FIG. 1) to be executed following the clear coating step (step S11), and then, on the basis of the measured result, the board temperature controller 75 performs to control the heating means 77 of the last chamber inside the dryer. The sheet roll (mounting carriage driving motor) controller 80 functions in such a manner that the both side portions of the polyethylene sheet 4 are detected at first by the sheet sides detector 81, on the basis of which the driving motor 82 of the roll-mounting carriage 20 is controlled so as to adjust the magnitude of shifting rightward or leftward of the roll-mounting carriage 20.

Further, upon finishing the cutting-off of the polyethylene sheet 4 by means of the laser knife 38, the driving motor 83 actuating the sheet roll 23 in the normal direction is caused to rotate in the reverse direction so as to wind up the polyethylene sheet 4. When it is detected, through the main controller 50, by the sheet rewind position-detecting switch 52 that the leading end of the polyethylene sheet 4 has been pulled back to the a position just in front of the rear main back-up roll 30, the driving motor 83 is stopped to stop the rotation of the sheet roll 23. Thereafter, when the leading end of the next work board is transferred to a prescribed position in front of the rear main back-up roll 30, the operation of the driving motor 83 that has been stopped so far is resumed so as to rerotate the sheet roll 23 in the normal direction.

Figure 8:
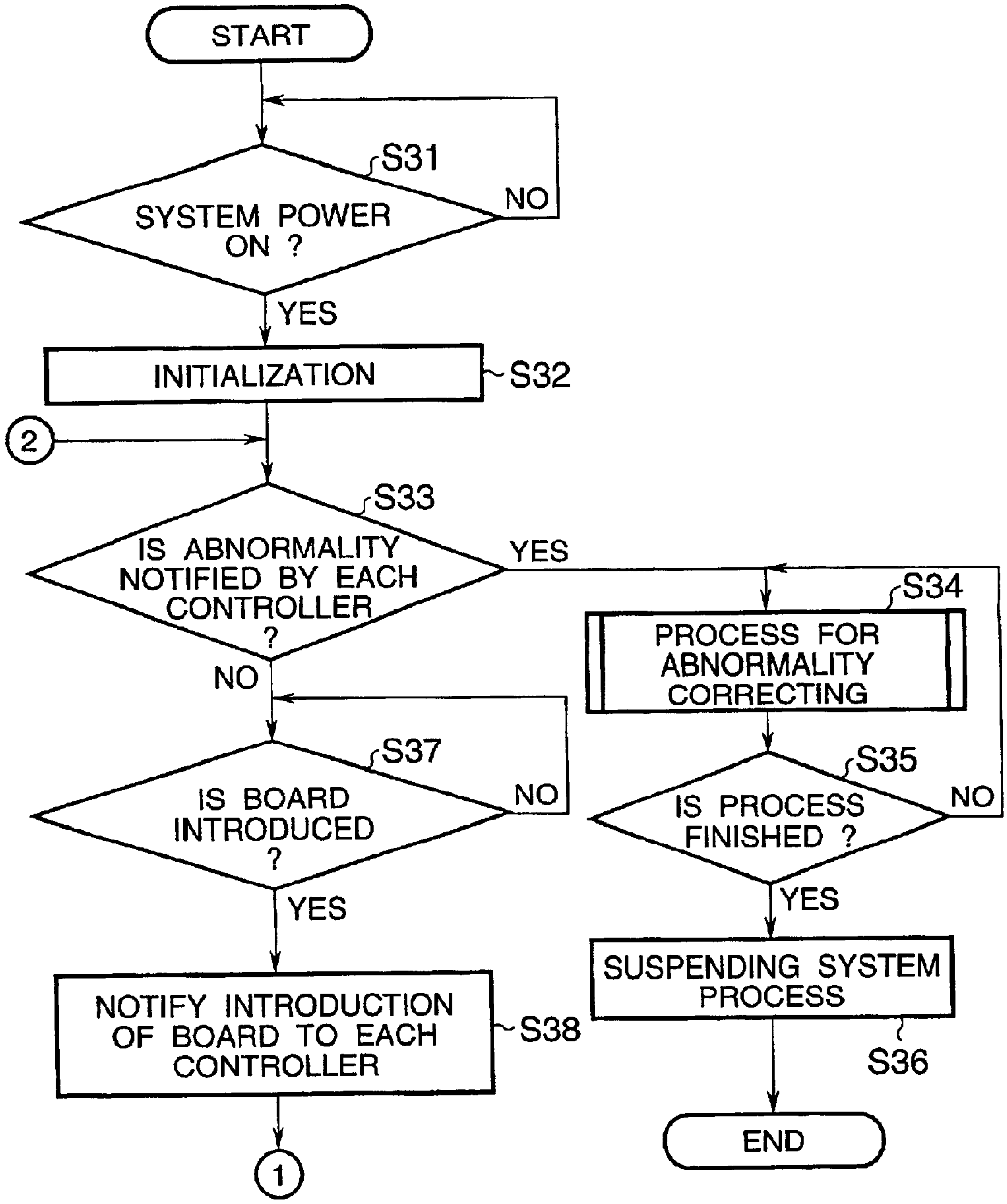
FIG. 8 is a flow chart (No. 1) for explaining the operation of the main controller.
Figure 9:
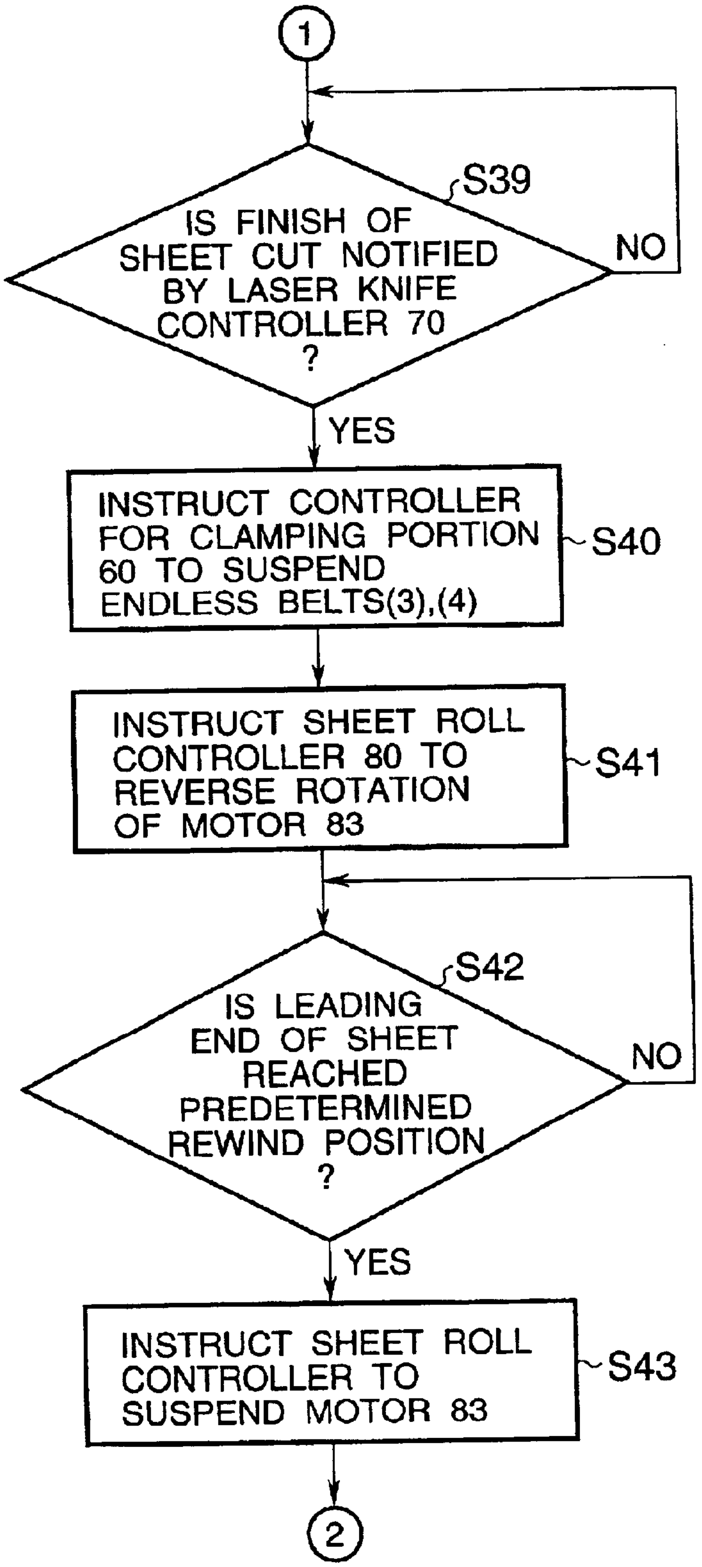
FIG. 9 is a continuation of a flow chart (No. 2) for explaining the operation of the main controller shown in FIG. 8.

FIGS. 8 and 9 respectively shows a flow chart for explaining the operation of the main controller 50 in this first embodiment. First of all, it is determined if the system power source is ON (step S31). If the answer is NO, the procedure is brought into a state of standby. If the answer YES, the initialization of the system is performed (step S32).

In the next step S33, it is determined as to if there is an information of abnormality from each controller. If the answer is YES and any abnormality is informed of, an abnormality-correcting process is performed (step S34). Thereafter, it is determined as to if this abnormality-correcting process has been finished (step S35). If the answer is NO and this process is not yet finished, the abnormality-correcting process is continued. If the answer YES, a system suspension processing is performed, thus finishing the flow. If the answer is NO in the step S33 and there is no abnormality, it is determined as to if the work board has been introduced (step S37). If the answer is NO, the procedure is brought into a state of standby until the work board is introduced. If the answer YES, the main controller 50 informs each controller of the introduction of work board (step S38). As a result, each controller is shifted to a control-starting state or a control standby state.

Next, referring to FIG. 9, it is determined as to if there has been an information from the laser knife controller 70 that the cut-off of the sheet has been finished (step S39). If the answer is NO, the procedure is brought into a state of standby. If the answer YES, the main controller 50 instructs the press-clamping portion controller 60 of halt of the endless belts (3) (4) 62 (step S40) and at the same time, the sheet roll controller 80 of reverse of the rotation of the driving motor 83 (step S41). Further, it is determined as to if the leading end of the polyethylene sheet 4 has reached the predetermined rewind position (step S42). If the answer is NO, the procedure is brought into a state of standby until the polyethylene sheet 4 reaches the predetermined rewind position. If the answer YES, the main controller 50 instructs the sheet roll controller 80 of stop of the operation of the driving motor 83 (step S43), thus returning to the step S33.

A Second Embodiment

Figure 10:
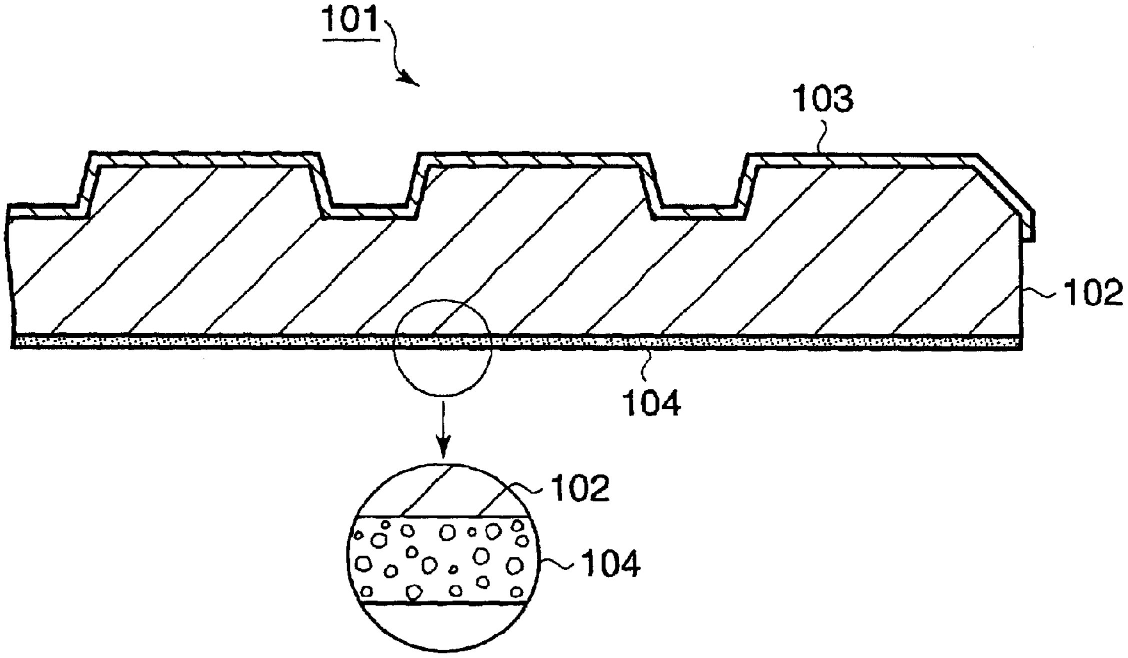
FIG. 10 is a partial cross-sectional view illustrating the construction of a building board according to the second embodiment.

FIG. 10 shows a partial cross-sectional view of the construction of a building board according to the second embodiment of the present invention. The building board 101 is constructed such that a top coat layer 103 is formed on the surface of a cement substrate 102, and a backing layer of foamed plastic, preferably a PE foamed layer 104 is formed on the back surface of the cement substrate 102.

The cement substrate 102 may be the same as the cement substrate 2 in the first embodiment.

The PE foamed layer 104 should preferably be consisted of a resin that has been formed under atmospheric condition, and as for used for resin which is excellent in chemical resistance and most preferably a foamed linear polyethylene which is not cross linked in view of the reproducibility thereof. It is possible, through the adjustment of the density thereof, to manufacture various kinds of PE foamed layer 104 which may be of a flexible type or a semirigid type. Further, it is also possible, through the adjustment of the incorporation of a foaming agent, to mold a PE foamed layer 104 having a desired thickness. The thickness of the PE foamed layer 104 should preferably be in the range of 0.5 to 3.0 mm. Because, if the thickness of the PE foamed layer 104 is less than 0.5 mm, it may raise a problem in terms of strength thereof and also may become impossible to expect a sufficient waterproofness thereof. On the contrary, if the thickness of the PE foamed layer 104 exceeds over 3.0 mm, the resultant building board would become too bulky as a whole, thus deteriorating the commercial value thereof.

The atmospheric expansion can be performed by a process wherein a mixture comprising a olefin resin, for example, polyethylene, polypropylene and so on, and a heat decomposable foaming agent such as azodicarbonamide is melt-kneaded by making use of an extruder or rolls at a temperature which is lower than the decomposition temperature of the foaming agent, and resultant kneaded mixture is premolded in a desired configuration such as a sheet-like configuration by any suitable means such as an extrusion molding, a press molding, etc. to obtain a premolded product, which is then introduced into a heating chamber for heating it to a temperature higher than the decomposition temperature of the foaming agent, thus enabling the resin to be formed at the atmospheric condition.

Figure 11A:
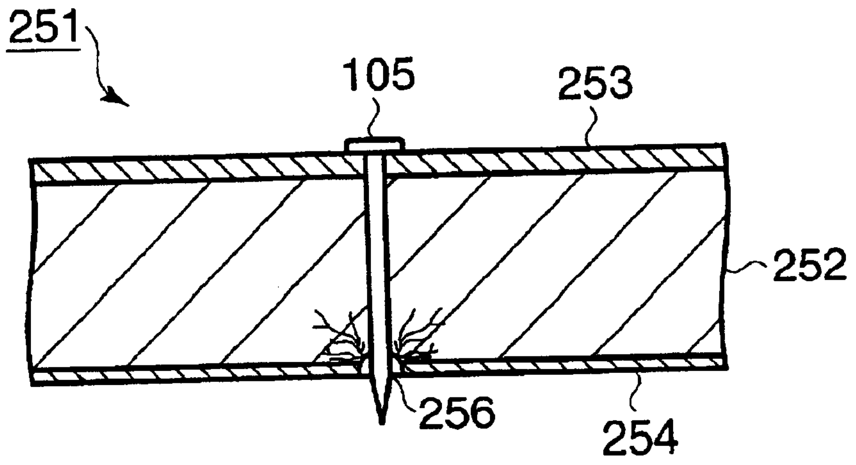
FIG. 11 shows cross-sectional views for illustrating the cracking at the rear surface of building board by mailing.
Figure 11B:
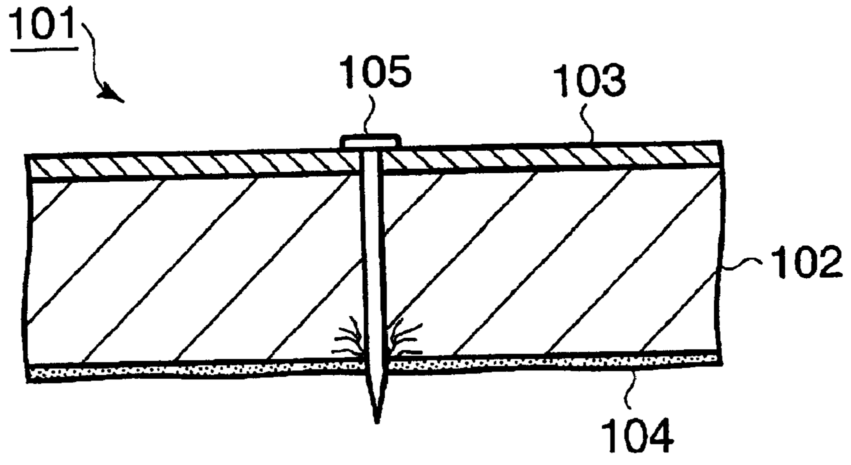

FIG. 11 illustrates the cracking of the back surface of building board when the building board is nailed. As shown in FIG. 11(*a*), in the construction where a nail 105 (or a screw) is driven through the front surface of a building board 251 so as to fasten the building board 251, the nail 105 is caused to protrude out of the back surface of the building board 251, and the portion 256 in the vicinity of the protruded portion of the nail 105 is caused to crack, thus damaging the cement substrate 252. Accordingly, the rain water that has impregnated into the back surface side of the building board 251 through the driven portion of the nail 105 (i.e. a small gap between the nail or screw and the work board) is inevitably allowed to turn into the back surface side of the cement substrate 252 if the building board 251 is constructed in such a manner that a conventional sealer layer 254 is coated on the back surface of the building board 251 or a plastic sheet backing is applied according to the aforementioned first embodiment. However, in the case of the second embodiment shown in FIG. 11(*b*), it is possible to prevent the cracking or chipping of the back surface of the building board 101.

Figure 12:
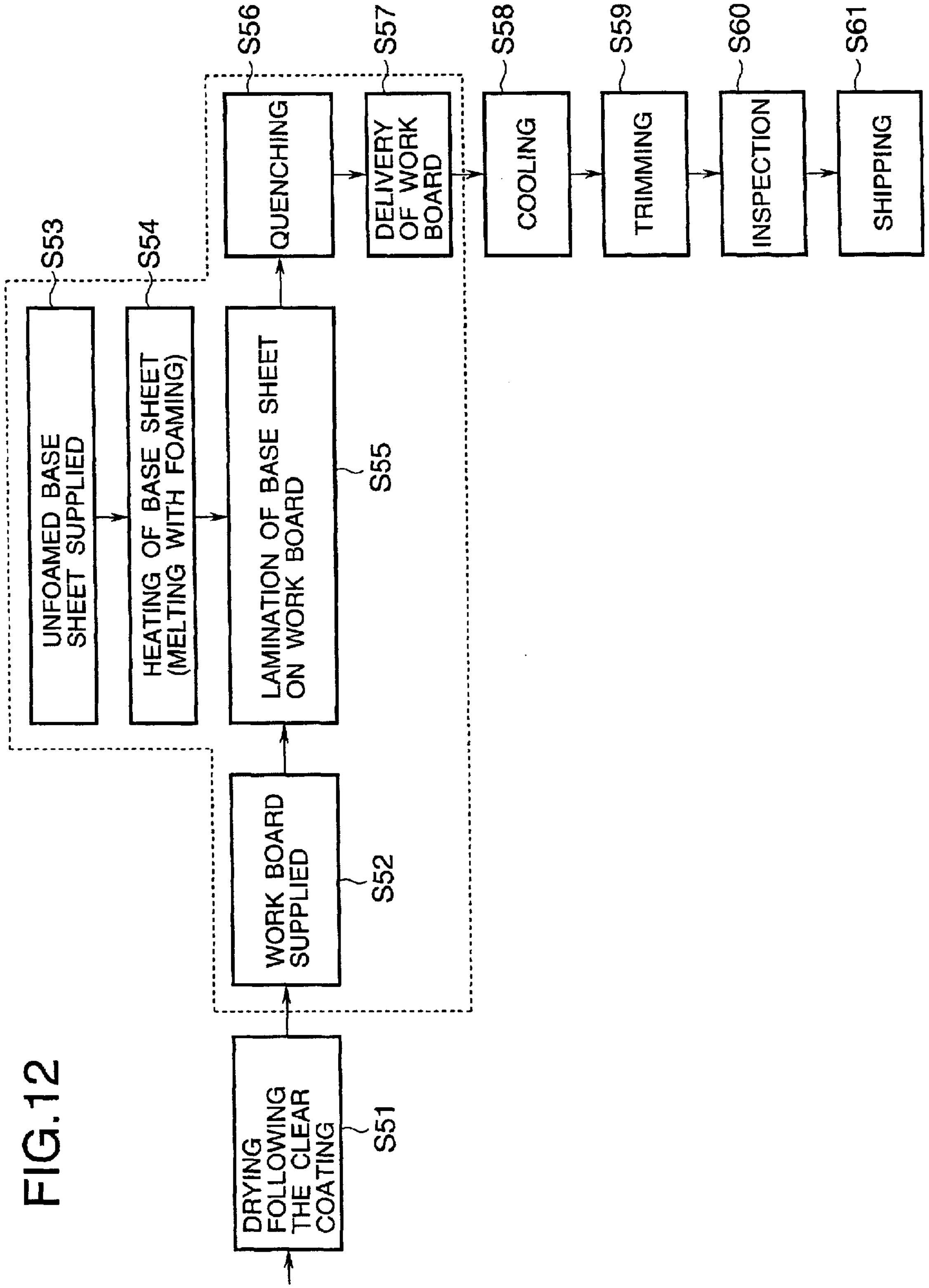
FIG. 12 shows a process chart for forming a PE-foamed layer at the back of a building board-manufacturing apparatus.

FIG. 12 shows a flow chart illustrating a back-working process of a PE-foamed layer using a building board-manufacturing apparatus according to the second embodiment of the present invention. A feature of the second embodiment is in that the backing with a sealer is omitted, so that after being subjected to the drying step (step S51) following the clear coating by the ordinary building board-manufacturing apparatus, a work board is supplied one by one in the working process (step S52), and a base sheet 111 (to be explained hereinafter) having a lots of isolated costing region of plastics kept in an unformed state is supplied (step S53). Thereafter, the base sheet is heated to increase in temperature at coated plastics, causing them to melt, while forming with that(step S54), and laminating the base sheet 111 on the work board "a" (step S55). Thereafter, this base sheet 111 is quenched (step S56) and the resultant work board "a" is delivered (step S57) again to the process of the ordinary building board-manufacturing apparatus, including the cooling step (step S58), a trimming step (step S59) where a superfluous portion of the foamed plastics which is protruded outside the outline of the work board "a" is cut off or trimmed, the inspection step (step S60), and the shipping step (step S61).

Figure 13:
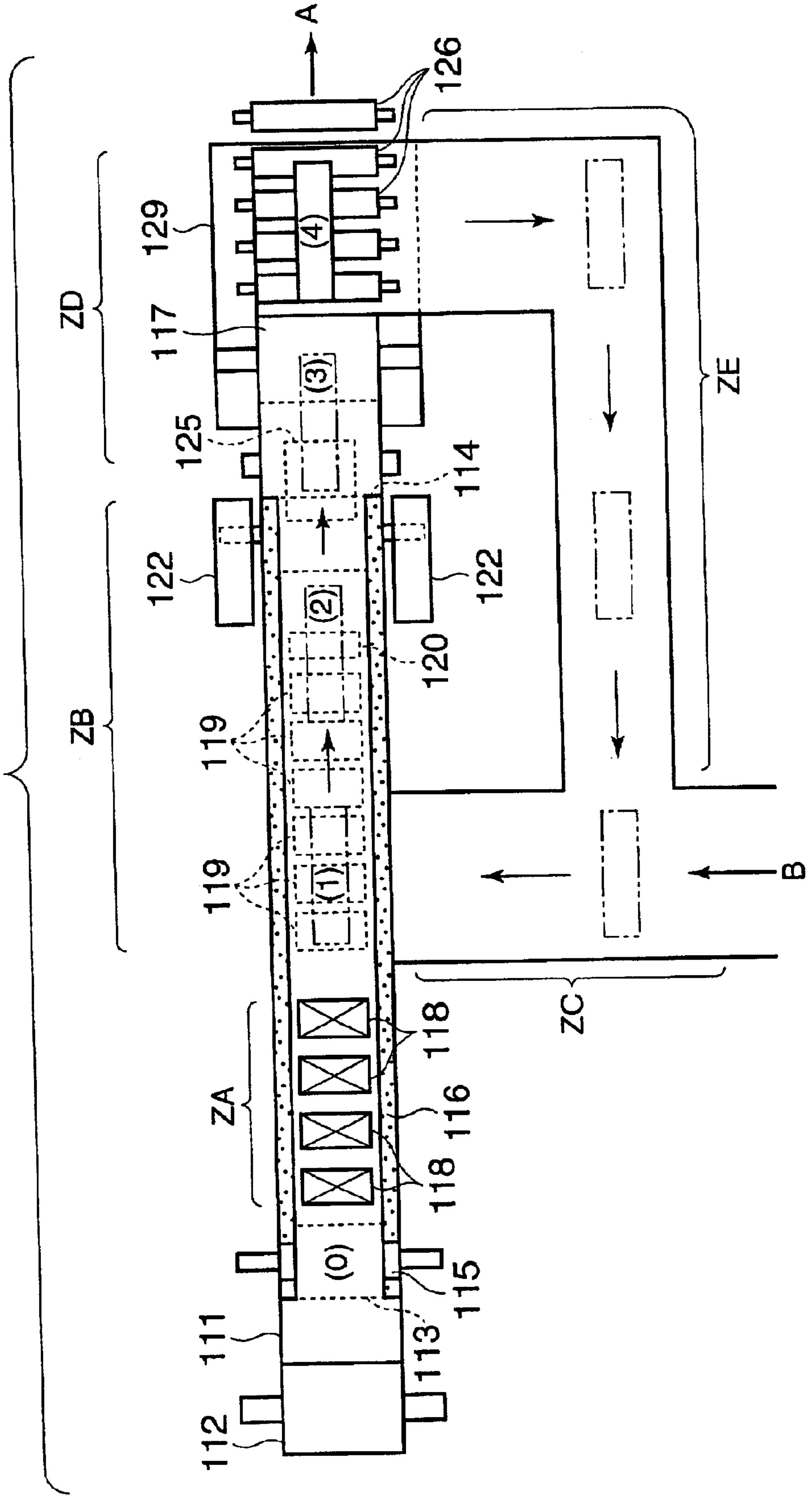
FIG. 13 is a top plan view illustrating the construction of a building board-manufacturing apparatus.
Figure 14:
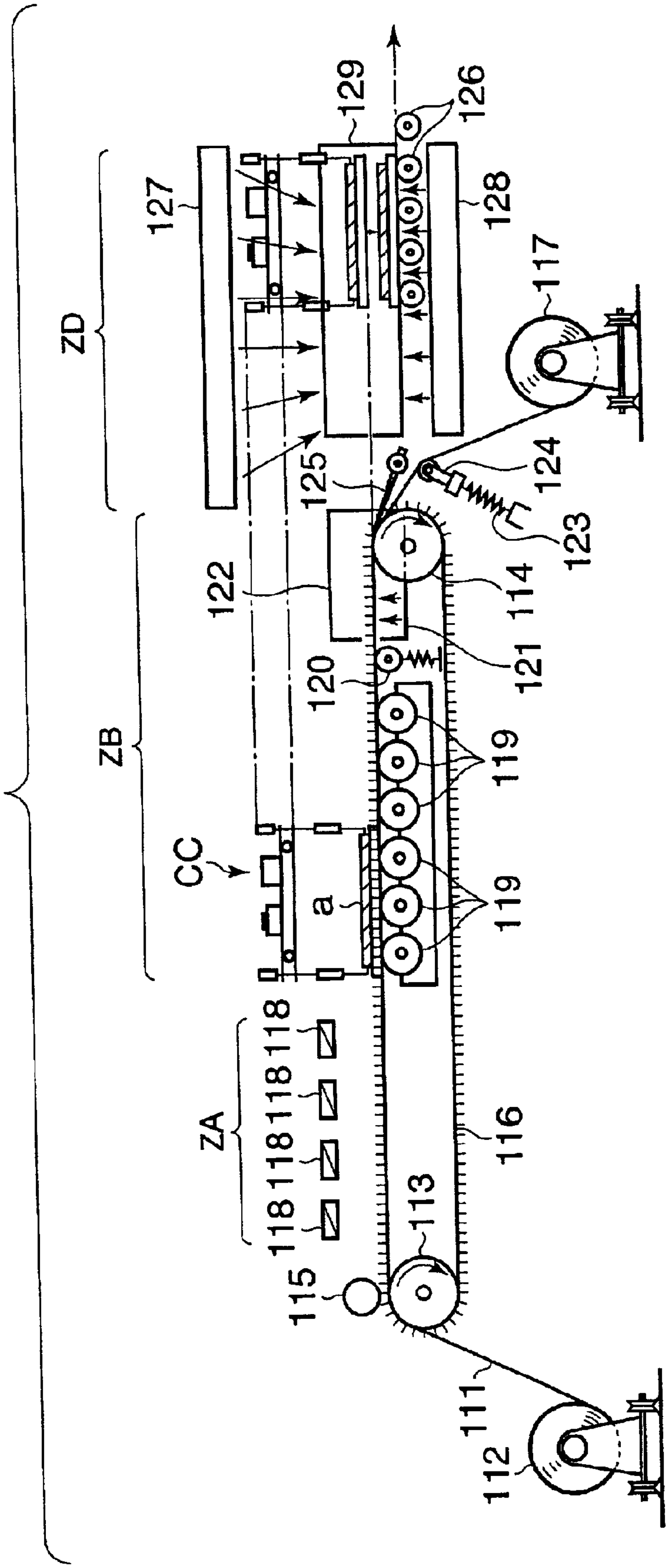
FIG. 14 is a side view illustrating the construction of a building board-manufacturing apparatus.

FIG. 13 is a top plan view illustrating the construction of a building board-manufacturing apparatus according to this second embodiment and FIG. 14 is a side view thereof. Referring to these FIGS., the work board "a" is designed to be transferred along the predetermined transferring passageway by means of a carriage cart CC (to be explained in detail in FIG. 17 ff.). The moving position of the work board "a" is represented by a two-dot and dash line in FIG. 13.

A special laminate sheet (hereinafter being referred to as the base sheet 111, which is specifically shown in FIG. 15) wound in the form of roll is delivered from a base sheet roll 112, and then, allowed to move, while being wound by means of a pin holding roll 115 around a pin tenter 116 to be driven by a fore roll 113 and a rear roll 114, up to a residual base sheet roll 117 so as to be wound up by the residual base sheet roll 117. First of all, when the base sheet 111 passes through a far-infrared ray heating zone ZA, the base sheet 111 is subjected to a non-contact heat treatment by means of a far-infrared ray heater 118 disposed over the running base sheet 111. For example, by rendering the base sheet 111 to receive this heat treatment at a temperature of 175° C. for 10 seconds, the PE coating portion 132 (see FIG. 15) formed on the base sheet 111 is caused to increase in temperature from the normal temperature (30° C.) up to 165° C. Due to this increasing temperature, the PE coating portion 132 formed on the base sheet 111 is caused to take a change of state, i.e. a softened state to a molten state. Then, the base sheet 111 is allowed to move, while being kept molten, toward a laminate processing zone ZB.

On the side of the laminate processing zone ZB is disposed a board-feeding zone ZC, so that the work board "a" delivered out of a dryer disposed on the downstream side of the clear coating step is designed to be introduced into the board-feeding zone ZC while being set on the carriage cart CC as explained hereinafter.

During the time interval between the board position (1) and the board position (2), the lamination process to mount the work board "a" on the base sheet 111 is executed.

In this lamination process, a processing wherein the work board "a" is subjected to the lamination process with the back surface being turned upward is seemingly advantageous in general in the light of the facts that it is easy in supporting the work board "a", that it is easy in performing the lamination processing, and that the construction of the apparatus can be simplified. However, there is a possibility that the front surface of the work board "a" may be damaged when a transfer roll is employed (it is desperate when the work board "a" having a greatly rugged surface is employed). Therefore, since it is generally designed such that the work board "a" is delivered out of the dryer with the front surface thereof being turned upward, the lamination processing in this case is performed with the front surface of the work board "a" being turned upward.

In this lamination processing, the back surface of the work board "a" is disposed to face the PE coating portion 132 which is already formed. Concurrently with this lamination processing, it is controlled that the back surface of the base sheet 111 wound around the pin tenter 116 is heated by the heat roll 119 to a predetermined temperature. For example, it is controlled that the PE coating portion 132 can be heated from 165° C. up to 185° C. Although the rate of increasing the temperature in this case can be determined through actual tests, this heating is generally performed in such a manner that the temperature of the PE coating portion 132 is mildly increased at first so as to allow the PE plastics to start the foaming. The expansion degree with time of the PE coating portion 132 is also controlled in such a manner that the temperature is increased to such a degree the an expansion degree of about 60% for instance can be achieved soon before the PE coating portion 132 reaches the bonding location, an expansion degree of about 80% for instance can be achieved when the PE coating portion 132 is located at the bonding location, and an expansion degree of about 100% can be achieved when the PE coating portion 132 has passed through the bonding location. Namely, the rate of increasing the temperature should be determined taking the moving speed of the pin tenter 116 into account. After this bonding process, the thickness of this expanded PE coating portion 132 is adjusted to a desired value by means of a clearance-adjusting roll 120. Thereafter, a cool air is blown from the a cool air-feeding duct 121 against back surface of the base sheet 111 which is being wound around the pin tenter 116, and the exhaust of the cooling air is performed by means of exhaust ducts 122 mounted on both sides of the apparatus, thus accomplishing the first stage cooling treatment. For example, it is controlled such that the PE coating portion 132 can be cooled from 185° C. down to 140° C.

Thereafter, the work board "a" that has been delivered out of the laminate processing zone ZB (at this moment, the work board "a" is mounted on the PE coating portion 132 formed on the continuous lengthy base sheet 111) is transferred as it is to the next cooling zone ZD, wherein both front and back surfaces of the work board "a" are cooled (for example, it is controlled such that both surfaces of the work board "a" is cooled from 140° C. down to 70° C.). At the board position (3), the base sheet 111 is released from the pin tenter 116, and the work board "a" provided on the back surface thereof with a PE foamed layer 104 is removed from the base sheet 111.

In this case, for the purpose of preventing the base sheet 111 from being entangled with the pin tenter 116, the base sheet 111 is pushed up by a pin-disengaging roll 124 whose position is designed to be adjusted by an adjuster 123. At the same time, it is designed that the work board "a" attached on the back surface thereof with the PE foamed layer 104 can be removed from the base sheet 111 by making use of a separator blade 125 (see FIG. 16). The residual portion of the base sheet 111 after the removal of the PE foamed layer 104 is designed to be wound up by the residual base sheet roll 117.

The laminated work board "a" that has been transferred to the board position (4) is then dismounted from the carriage CC and mounted on a transfer roll 126 disposed below so as to be transferred out of the cooling zone ZD. In this case, this transfer roll 126 is arranged such that the upper surface of the transfer roll 126 is positioned lower than the surface of the base sheet to be delivered by means of the pin tenter 116.

In the cooling zone ZD, it is designed such that cooling air is positively blown against both front and back surfaces of the work board "a" from an upper cooling air supply duct 127 as well as from a lower cooling air supply duct 128. The cooling air blown out is subsequently recovered by means of the exhaust duct 129. The carriage cart CC is then allowed to return via the cart return zone ZE to the start position in the board supply zone ZC.

Figure 15:
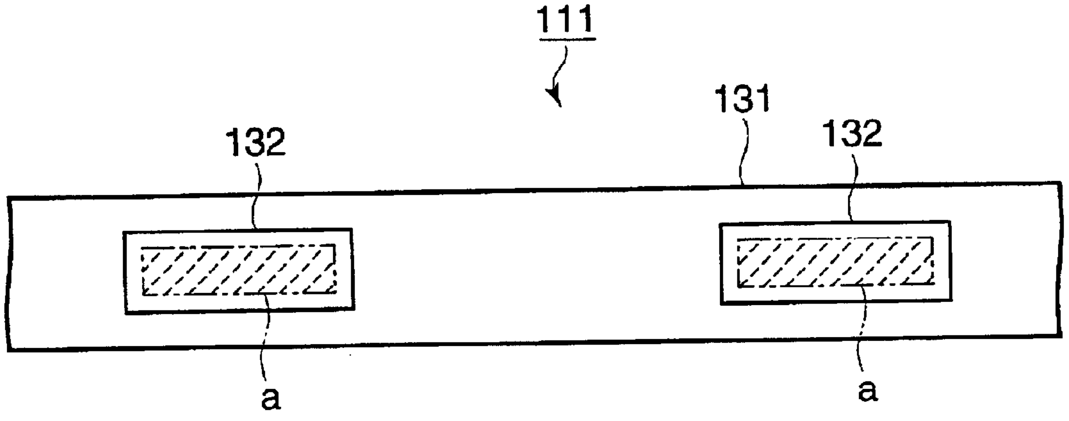
FIG. 15 is a plan view for explaining a base sheet shown in FIGS. 13 and 14.

FIG. 15 is a plan view for explaining the base sheet 111. This base sheet 111 is composed for example of a lengthy heat resistant regenerated PET (polyethylene terephthalate) unwoven (or woven) fabric 131, on the front surface of which a plurality of rectangular un-foamed PE coating portions 132 each having an area which is slightly larger than the back surface of the work board "a" are coated at predetermined intervals. In this case, when a heat resistant releasing agent is thinly coated on the surface of the base sheet 111 to such a degree that would not hinder the coating of the PE coating portions 132, the removal of the regenerated PET unwoven fabric 131 from the PE foamed layer 104 of the building board 101 can be more smoothly executed.

The intervals of the PE coating portions 132 on the surface of the base sheet 111 can be determined according to the processing velocity. For example, if a foregoing PE coating portion 132 is assumed to be located at the board position (2) in FIG. 13, the next PE coating portion 132 can be positioned at the board position (0) which is just in front of the far-infrared ray heating zone ZA.

Figure 16:
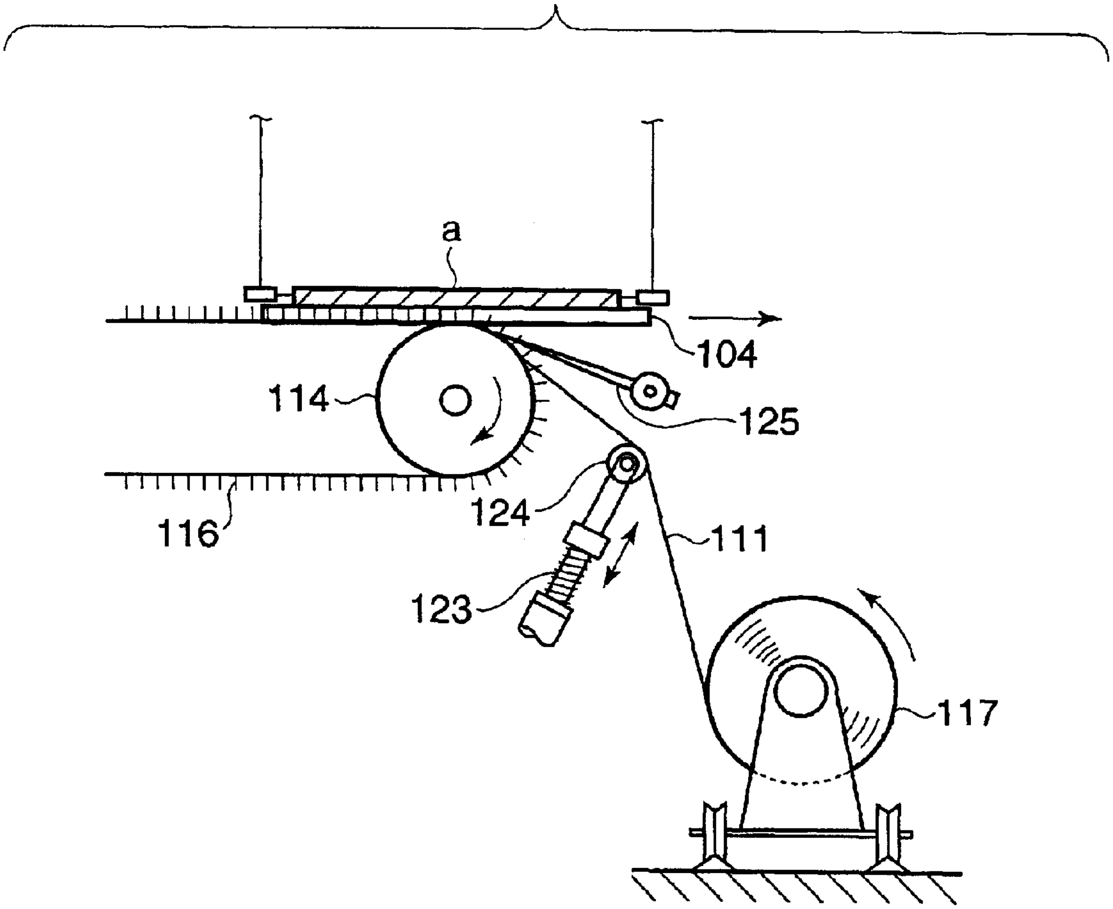
FIG. 16 is a side view for explaining a state of detaching a residual base sheet and the work boards from a pin tenter shown in FIG. 14.

FIG. 16 shows a state of separating the base sheet 111 and the work board "a" from the pin tenter 116. In this case, a separator blade 125 having a suitably radiused tip end so as to prevent the base sheet 111 from being fractured is contacted with a boundary portion between the base sheet 111 and the PE foamed layer 104 at a suitable angle (which is adjustable) so as to separate the base sheet 111 and the PE foamed layer 104.

Figure 17:
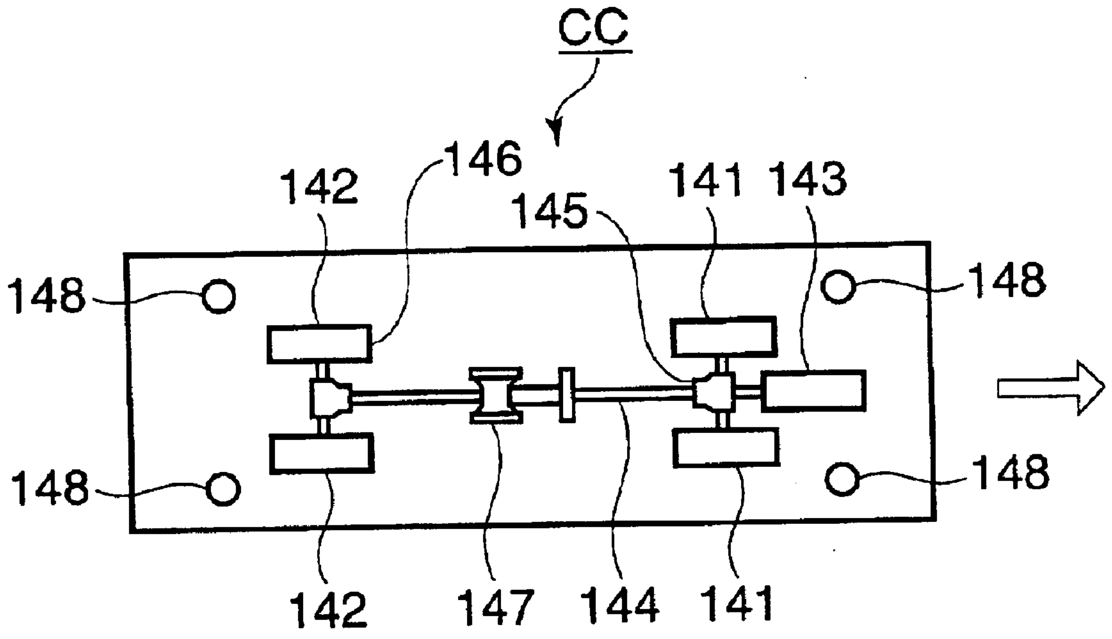
FIG. 17 is a plan view showing a driving system disposed on the bottom of a carriage cart CC shown in FIG. 14.
Figure 18:
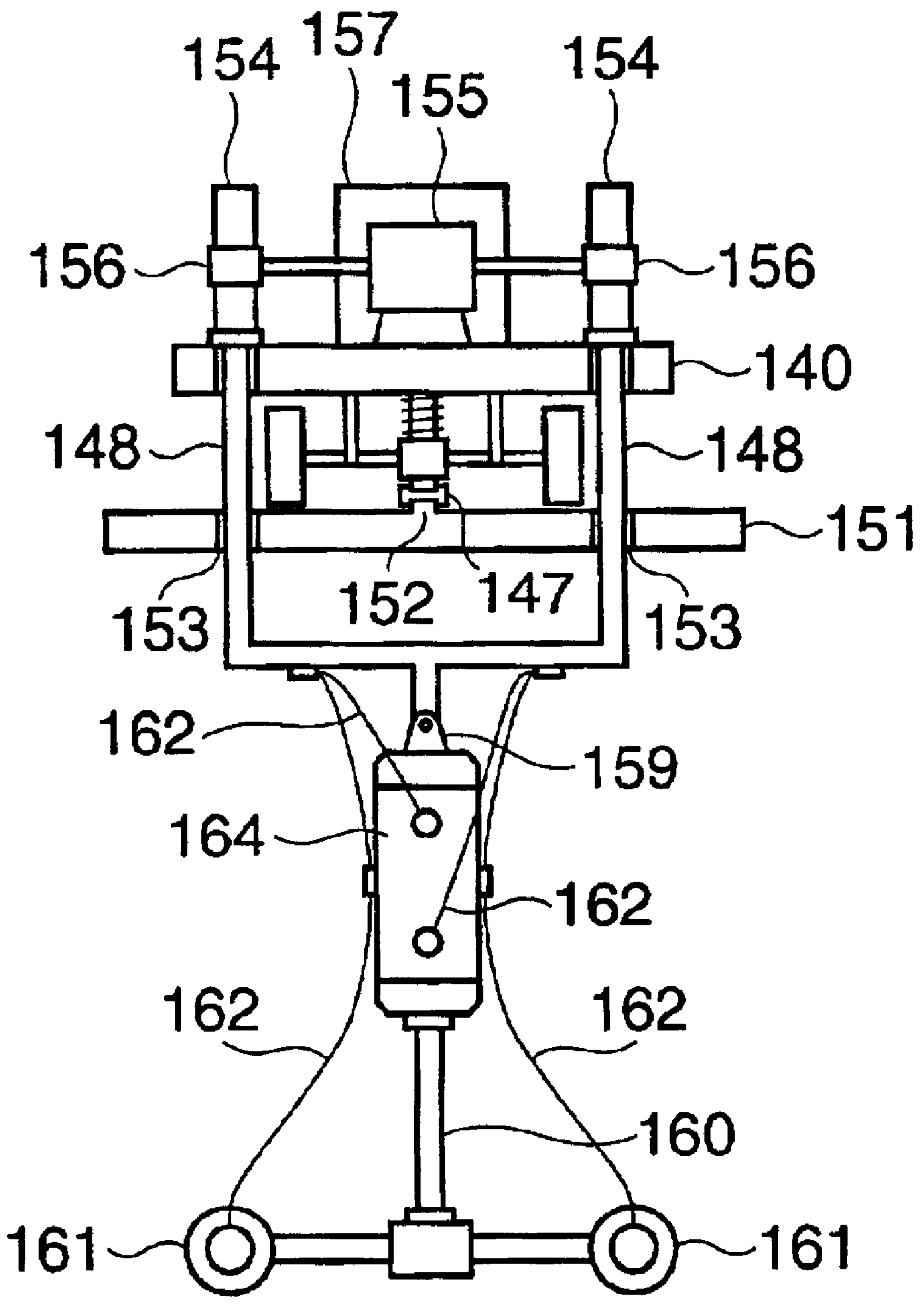
FIG. 18 is a side view observed in the direction of travel of the carriage cart.
Figure 19:
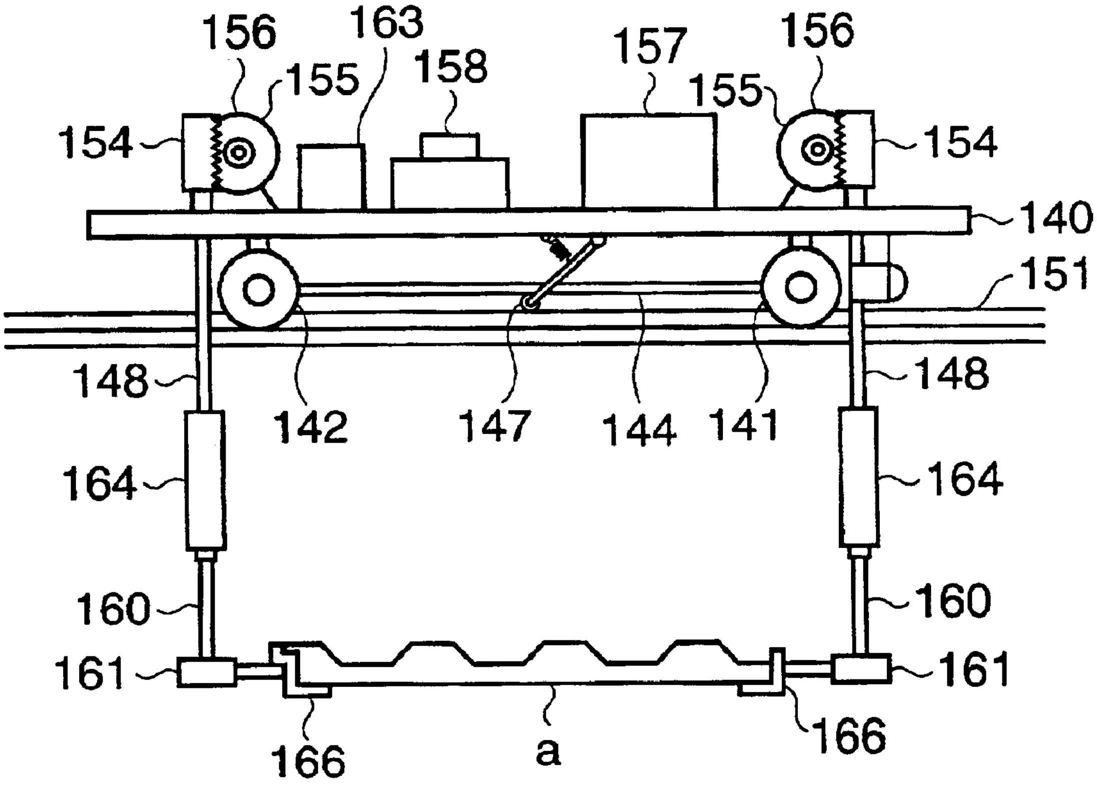
FIG. 19 is a perspective view showing the detailed construction of the carriage cart shown in FIG. 14.

FIG. 17 is a plan view showing a driving system disposed on the bottom of the carriage cart CC; FIG. 18 is a side view showing the construction of the carriage cart CC; and FIG. 19 is a front view showing the construction of the carriage cart CC. This carriage cart CC is a four wheel drive type carriage cart to be driven by means of an electric motor. The four wheels (tyres) consisting of front wheels 141 and rear wheels 142 are designed to move along a plane transferring passageway 151 (FIG. 18). The propeller shaft 144 is to be driven by a motor 143, and the front wheels 141 and rear wheels 142 are designed to be driven by a front differential gear 145 and a rear differential gear 146, respectively. A center guide roll 147 is attached to the central portion of the center line in the moving direction and is allowed to rotationally slide on the center guide rail 152 attached along the center line of the plane transferring passageway 151, thereby preventing the meandering of the carriage cart CC.

As shown in FIGS. 17 and 18, a slot 153 is formed respectively on both sides of the center guide rail 152 so as to enable a pipe-shaped hanger 148 attached to the bottom of the carriage cart CC to move therethrough (four corner portions of the slots are cut in an L-shape).

Figure 26:
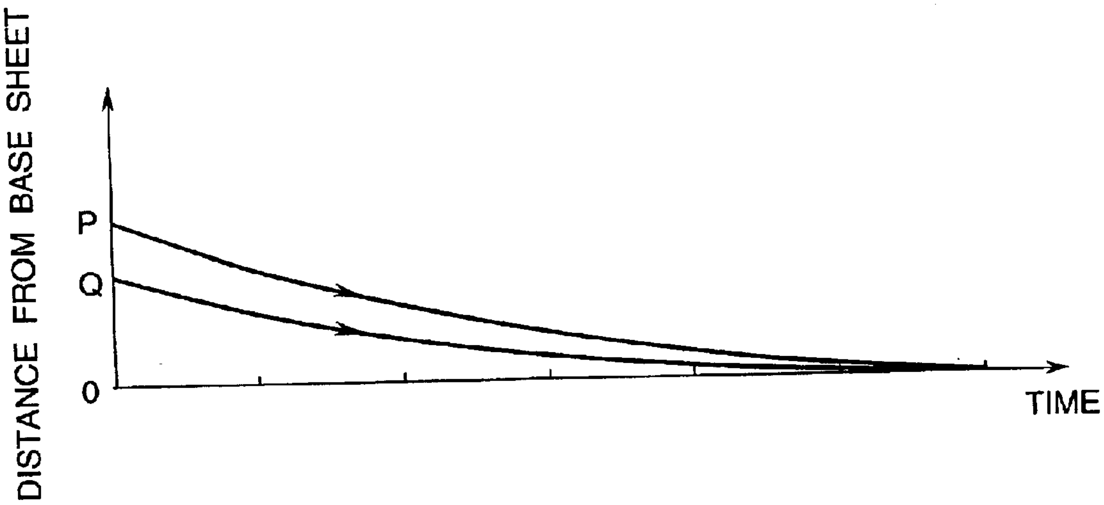
FIG. 26 is a graph (No.2) illustrating the operation of hangers installed on the carriage cart CC in a zone B shown in FIG. 14.

The movement of the hanger 148 (the descending movement and the ascending movement) is effected through the manipulation of a rack gear 154 attached to an upper portion of the hanger 148, and the actuation of the rack gear 154 is effected by means of a pinion gear 156 interlocked with a stepping motor 155 as shown in FIGS. 18 and 19. The speed and direction of rotation of the stepping motor 155 are controlled according to a pulse-converted program which has been prepared on the basis of the locus curve as shown in FIG. 26. On the trestle 140 of the carriage cart CC, there are additionally disposed various members such as a controller 158 for controlling the carriage cart CC as a whole, a battery 157 functioning as a power source of the carriage cart CC, and a small compressor 163 for actuating, through an air hose 162, double-acting air cylinders 164 each connected via a hinge 159 with the hanger 148 and a couple of single-acting air cylinders 161 which are disposed away from each other and secured to the distal end of each piston rod 160.

Figure 20:
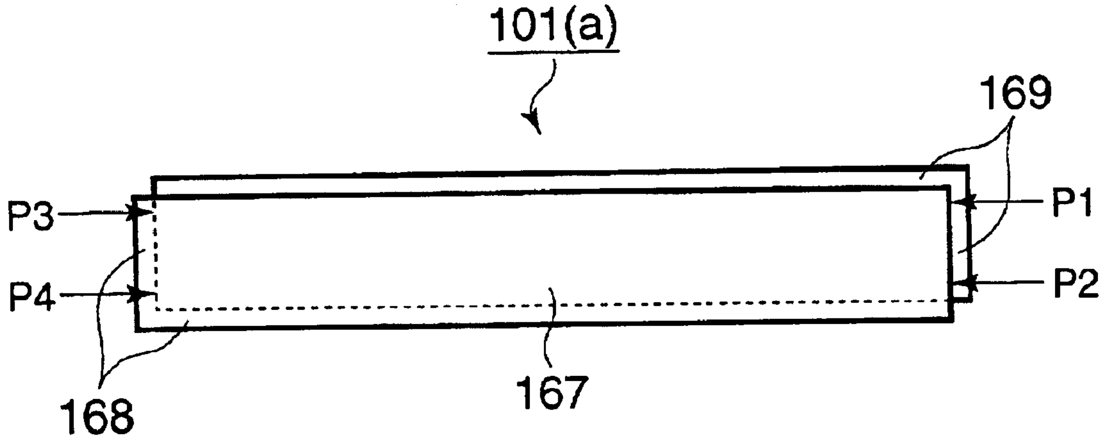
FIG. 20 is a plan view showing peripheral ends of a building board shown in FIG. 19.

FIG. 20 shows a plan view of the building board 101. When a work board "a" having a shiplapped configuration on four sides thereof is assumed to be employed as the building board 101 that will be fed to the aforementioned lamination processing, since the work board "a" is required to be treated with the design portion (coated surface) thereof being turned upward, a left side portion of the female rabbet portion 168 and a right side portion of the male tongue portion 169 (when they are viewed in FIG. 20) are designed to be supported respectively by each of holding members 166 shown in FIG. 19 (the surfaces of which are covered with a rubber so as to enhance the frictional force) which are attached to the distal ends of the single-acting air cylinder 161 respectively and are designed to be press-contacted with these rabbet and tongue portions 168 and 169 at each pressing point P1, P2, P3 and P4 as shown in FIG. 19, thereby holding both ends of the work board "a". In this case, the elevational position of the single-acting type air cylinder 161 shown in FIG. 19 may be adjusted by means of the double-acting air cylinder 164 shown in FIG. 19, etc.

Figure 21:
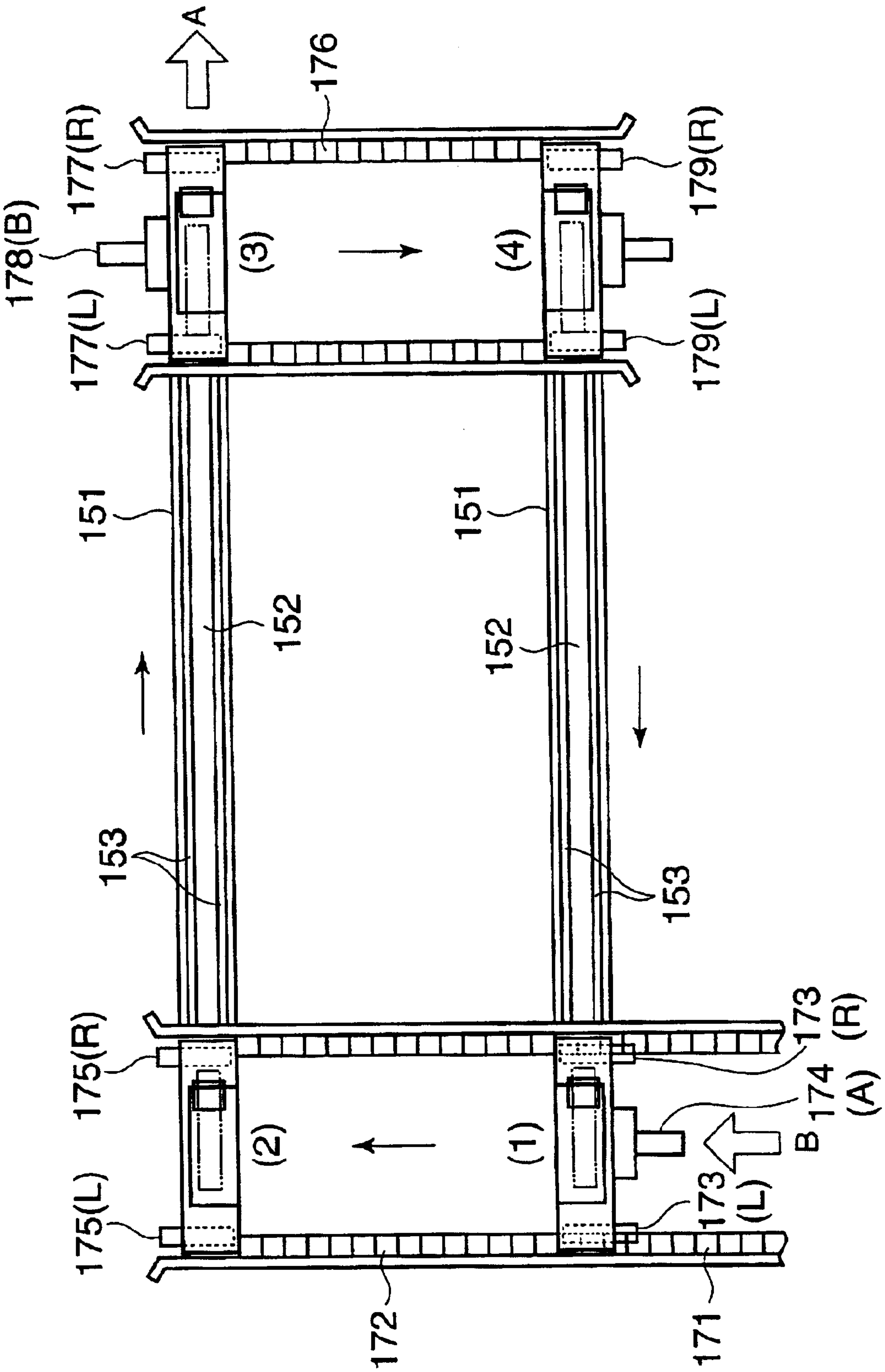
FIG. 21 is a side view showing the entire transferring line of the carriage cart CC shown in FIG. 14.

FIG. 21 illustrates the entire transferring system of the carriage cart CC which is to be disposed at each of the board supply zone ZC, the lamination processing zone ZB, the cooling zone ZD and the cart-return zone ZE each zone is shown in FIG. 19. This entire transferring system is constituted by four rectangular transferring passageways which are connected with each other, thus forming a circle. More specifically however, this entire transferring system is constituted by two kinds of corresponding transferring passageways, i.e. one of them is a couple of plane transferring passageways 151, and the other is a couple of transferring passageways which are constituted by a couple of chain conveyors 172 and 176 for supporting both end portions of the bottom of the trestle 140 shown in FIG. 19.

For convenience' sake, the rectangular carriage carts CC are respectively positioned at each corner portion of the transferring passageways. However, the moving position of each carriage cart CC and the number of carriage cart CC to be employed can be varied depending on the processing conditions, so that they will be controlled by making use of a computer so as to enable each process to be smoothly executed.

FIGS. 22A and 22B are a diagram illustrating the successive operation of the entire carriage cart CC shown in FIG. 21.

1. When the carriage cart CC reaches the position (1), the cart-driving motor 143 is halted.

2. The board-introducing chain conveyor 171 is turned ON so as to transfer the work board "a" to the position (1), and then, the board-introducing chain conveyor 171 is turned OFF.

3. The solenoid valve of the single-acting cylinder 161 is turned ON so as to set the work board "a" on the carriage cart CC while keeping the work board "a" in a halted state.

4. By making use of a limit switch, the lifters (1) L, R173 supporting the bottom of the trestle 140 of the carriage cart CC are caused to move up and down so as to lift the carriage cart CC up to the upper chain moving position of the board-introducing chain conveyor 172 which is disposed higher.

5. A pusher A174 is advanced back and retracted so as to push the carriage cart CC forward, thereby enabling the carriage cart CC to ride, from the position (1), onto the board-introducing chain conveyor 172 which is being driven.

6. By making use of a limit switch, the carriage cart CC are caused to move up to the position (2) by means of the board-introducing chain conveyor 172.

7. By making use of a limit switch, the lifters (2) L, R175 are caused to move down and up so as to lower the carriage cart CC down over the plane transferring passageway 151.

8. The cart-driving motor 143 is driven in the direction of normal rotation in such a way of: accelerated velocity→constant velocity→decelerating velocity→halt, thereby enabling the carriage cart CC to move from the position (2) to the position (3).

9. The work board "a" is placed down on the transferring roll 126 (FIGS. 13 and 14) from the carriage cart CC by means of the rack gear 154 of the hanger 148. The solenoid valve of the single-acting air cylinder 161 is turned OFF.

10. The transferring roll 126 is operated or suspended, thereby delivering the work board "a".

11. By making use of a limit switch, the lifters (3) L, R177 are caused to move up and down so as to lift the carriage cart CC up to the upper chain moving position of the board-delivering chain conveyor 176 which is disposed higher.

12. A pusher B178 is advanced and retracted so as to place the carriage cart CC from the position (3) onto the board-delivering chain conveyor 176 which is being driven.

13. By making use of a limit switch, the carriage cart CC are caused to move up to the position (4) by means of the board-delivering chain conveyor 176.

14. By making use of a limit switch, the lifters (4) L, R179 are caused to move down and up so as to lower the carriage cart CC down over the plane transferring passageway 151.

15. The cart-driving motor 143 is driven in the direction of reverse rotation in such a way of: accelerated velocity→constant velocity→decelerating velocity→stop, thereby enabling the carriage cart CC to move from the position (4) to the position (1).

16. Returns to the operation of No.1 aforementioned paragraph 1.

Figure 23:
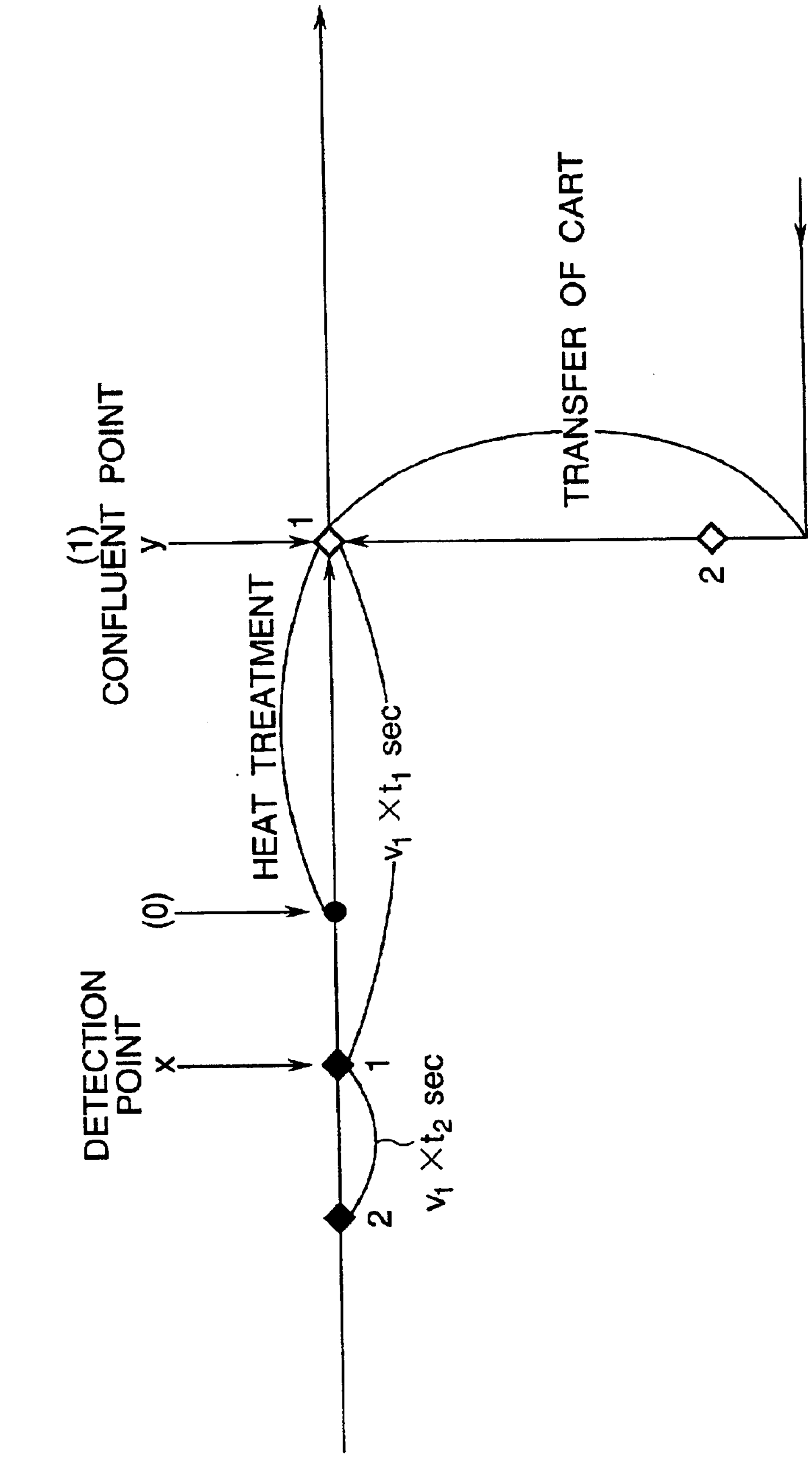
FIG. 23 is a diagram illustrating the transfer timing for both the carriage cart CC going toward a portion directly under the entire transfer line of the carriage cart CC and PE-coating portion on a residual base sheet.

FIG. 23 is a diagram illustrating the moving timing between a PE-coating portion 132 (represented by ♦) and the carriage cart CC (represented by ◇) for transferring the work board "a" on the back surface of which the PE-coating portion 132 is to be laminated (see FIG. 15). In this case, the axis of abscissa represents a moving passageway of the "♦" with which the "◇" joins from the confluent point y. (0) shows the board position (0) shown in FIG. 13. When the leading end of the "♦" passes through the detection point x, the passage thereof is detected by means of a color mark sensor and so on. For performing the lamination between the PE-coating portion 132 and the work board "a", it is required that they are located at the same position and moving at the same velocity at the occasion of lamination. However, while the "♦" is moving at a constant velocity on the base sheet 111, the "◇" starts to move directly from the confluent point y for the purpose of the lamination processing. Therefore, the "◇" is required to start the moving thereof before the "♦" is transferred to the confluent point y.

Figure 24:
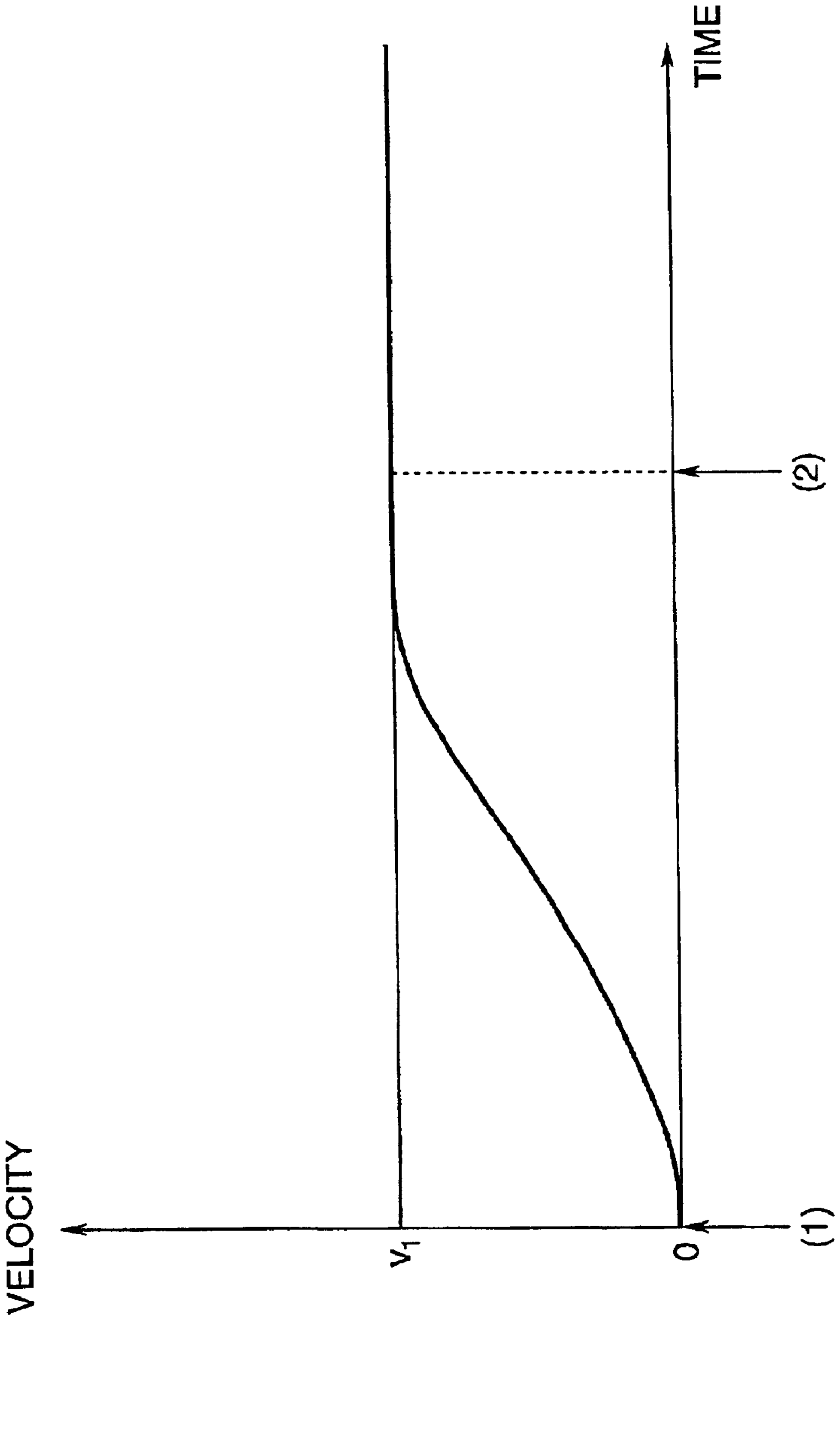
FIG. 24 is a graph illustrating a moving velocity of both the carriage cart CC and PE-coating portion on a residual base position, from a position (1) of the entire transfer line of the carriage cart CC to a position (2)

FIG. 24 is a graph explaining the velocities of these "♦" and "◇", wherein the axis of abscissa represents the time, while the axis of ordinate represents the velocities of them. While the "♦" is moving at a constant velocity v1 (the moving velocity of the pin tenter 116 shown in FIG. 14), the "◇" increases smoothly its velocity from the initial velocity 0 up to the velocity v1, after which the "◇" continues to move at a constant velocity. Since the moving distance required to make both velocities identical with each other can be represented by the time integration of velocity, the "♦" is caused to move two times as long as that of the "◇" in the case shown in FIG. 24. Therefore, under the condition where the "♦" is designed to be detected at a position "x" which corresponds with this difference in distance (v1×t1 (sec.)), if the "◇" is caused to start the moving thereof from the starting point (1) in conformity with the timing to detect the "♦" and subsequently allowed to accelerate the velocity thereof, it becomes possible to make both "♦" and "◇" identical in moving position thereof at the moment when the velocity of the "♦" becomes identical with the velocity of the "◇". Thereafter, referring to FIG. 23, when the "♦2" is designed to pass through the detection position "x" t2 second(s) after the detection of the "♦1", the cart 2 "◇2" is required to start the moving thereof from the start position (1) at the detected time of the "♦2". As a result, it becomes possible to control the foregoing cart and the next cart in such a manner that they are certainly separated from each other by a distance corresponding to the time of t2 at the moment when they pass through the start position (1).

Since the pin tenter 116 is operated at a constant velocity as explained above, it is possible to control the moving of the carriage carts in the aforementioned manner only if the "♦" is coated on the base sheet at predetermined intervals, thus making it possible to smoothly execute the lamination processing.

As for the start position (1) and the length of each transferring passageway, they can be optimally set within an adjustable range of the error in the moving of the carriage cart CC and of the timing of the carriage cart in relative to the pin tenter 116.

Figure 25:
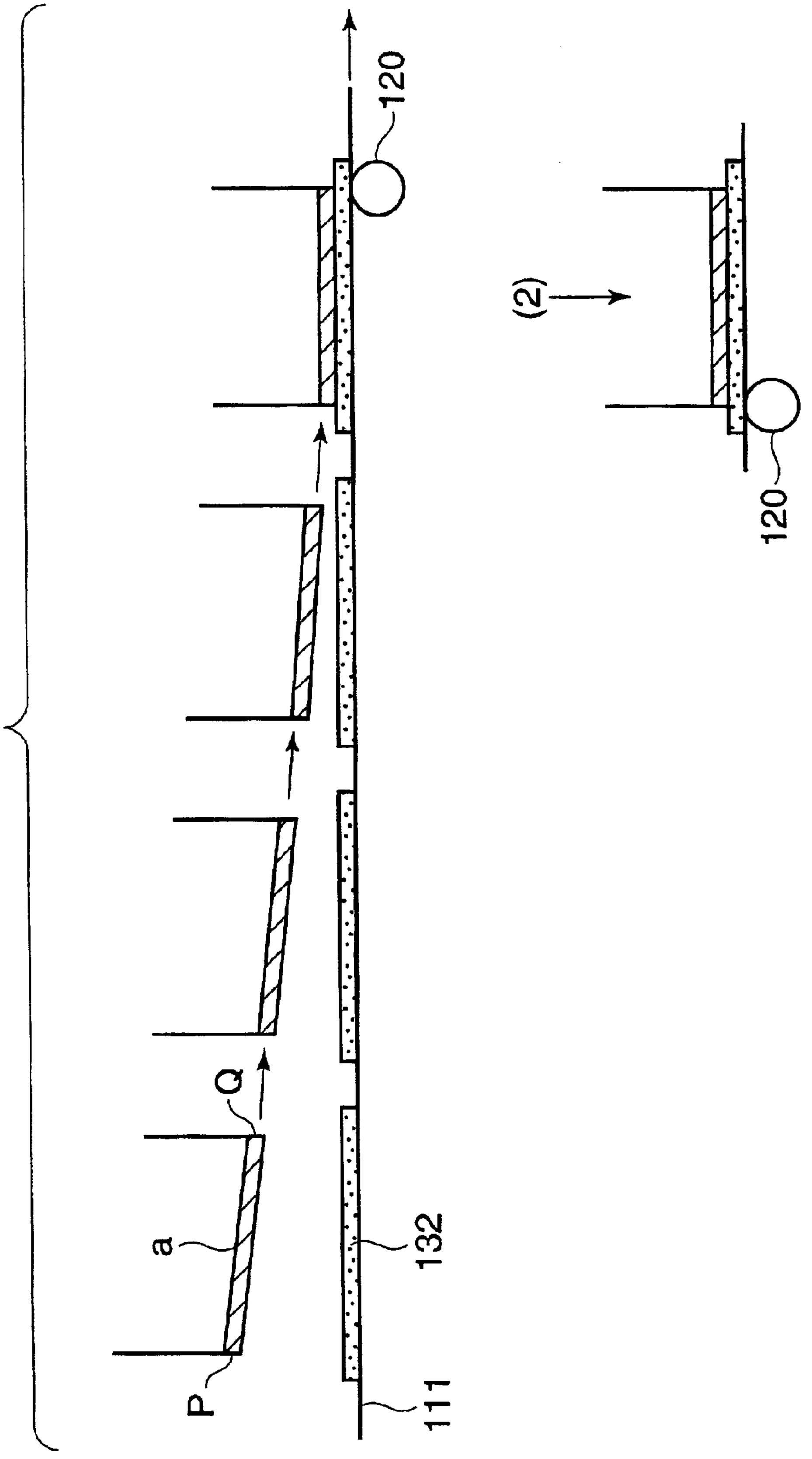
FIG. 25 is a graph (No.1) illustrating the operation of hangers installed on the carriage cart CC in a zone B shown in FIG. 14.

FIGS. 25 and 26 illustrate the operation of hangers 148 shown in FIGS. 18 and 19 in a laminating step. During the time where the carriage cart CC is allowed to move from the board position (1) shown in FIG. 13 up to the board position (2), fore and rear the hangers 148 neighboring to each other are controlled such that the length thereof can be individually changed by means of the rack gear 154 shown in FIG. 19 so as to enable the rear end P and leading end Q of the work board "a" depict a locus as shown in FIG. 26. When these hangers 148 are controlled in this manner, the work board "a" is allowed to approach the underlying upper surface of the base sheet 111 while gradually decreasing the angle thereof in relative to the upper surface of the base sheet 111. Accordingly, at the board position (2), the back surface of the work board "a" can be completely rested on the PE-coating portion 132. Namely, it is possible to realize a so-called soft landing of the work board "a" on the PE-coating portion 132, thus making it possible to perform a reliable lamination while limiting the entrapment of air to a least degree.

The movement of the hanger 148 (the descending movement and the ascending movement) is effected through the manipulation of a rack gear 154 attached to an upper portion of the hanger 148, and the actuation of the rack gear 154 is effected by the stepping motor 155 as shown in FIG. 19. The speed and direction of rotation of the stepping motor 155 are controlled according to a pulse-converted program which has been prepared on the basis of the locus curve as shown in FIG. 26.

Figure 27:
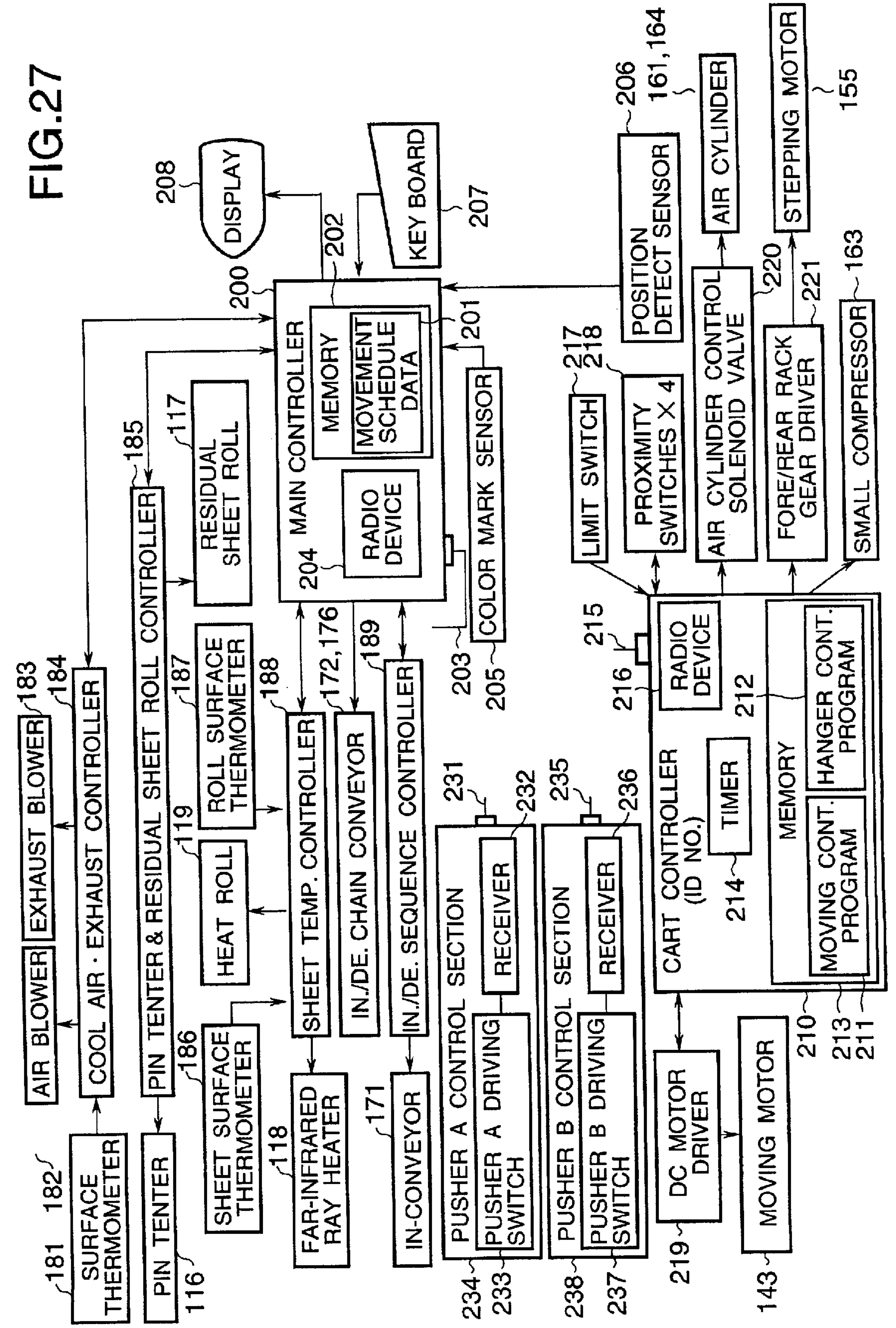
FIG. 27 is a block diagram illustrating the entire construction of a building board-manufacturing apparatus.

FIG. 27 is a block diagram illustrating the entire construction of a building board-manufacturing apparatus according to the second embodiment of the present invention. The main controller 200 which is provided with a memory 202 for storing the moving schedule data 201 of the carriage cart CC and also with a radio device 204 for performing radiocommunication through an antenna 203 is connected with a color mark sensor 205 for detecting the passage of the PE-coating portion 132 at a predetermined location, with a position detecting sensor 206 for detecting, by means of a photoelectric switch, the position of the carriage cart CC on the transferring passageway thereof, with a key board 207 for performing the input of data required, and with a display device 208 for displaying a desired data. This main controller 200 is designed to control various members as follows. First of all, the surface temperature of the work board "a" is detected by a surface thermometer 181 so as to control a cool air/exhaust controller 184 which is designed to control an air blower 182 and an exhaust blower 183. A pin tenter/residual base sheet roll controller 185 for controlling the pin tenter 116 and the residual base sheet roll 117 is also controlled. The surface temperature of the base sheet 111 is detected by a sheet surface thermometer 186 and at the same time, the surface temperature of each heat roll 119 is also detected by each roll surface thermometer 187 so as to control a sheet temperature controller 188 which is designed to control the far-infrared ray heater 118 and the heat rolls 119. The board-introducing chain conveyor 172 and the board-delivering chain conveyor 176 are also controlled. A board-introducing/cart-transferring sequence controller 189 for controlling the board-introducing conveyor 171 and the delivery of the carriage cart CC is also controlled.

The cart controller 210 provided with a memory 213 for storing a moving control program 211 and a hanger control program 212, with a timer 214 for measuring the time, and with a radio device 216 for performing a radiocommunication through an antenna 215 detects its own movement by means of a limit switch 217 for detecting the resting of the carriage cart CC and by means of a proximity switch 218 for detecting the arrival of the carriage cart CC at a corner portion. Based on the detection of its own movement, the cart controller 210 acts to control the air cylinders 161 and 164 by means of an air cylinder control solenoid valve 220, control the stepping motor 155 by means of fore and rear rack gear-drivers 221, control the small compressor 163, and control the moving motor 143 by means of a DC motor driver 219.

A pusher A control section 234 is provided with a receiver 232 for receiving an aimed radio signal through an antenna 231, and with a pusher A driving switch 233 for driving a pusher A174 for changing the moving direction of the carriage cart CC.

A pusher B control section 238 is provided with a receiver 236 for receiving an aimed radio signal through an antenna 235, and with a pusher B driving switch 237 for driving a pusher B178 for changing the moving direction of the carriage cart CC.

Each carriage cart CC is individually identified by an ID number, which is then registered in advance in the main controller 200. This main controller 200 functions to wirelessly control the operating state of each carriage cart CC. Specifically, according to the detected information by the color mark sensor 205 on the PE coating portion 132, the main controller 200 instructs the carriage cart CC positioned at the start position (1) to start the moving thereof. In this case, if it is designed in such a manner that the arrival of each carriage cart CC at the four corner portions of the cart passageway for instance can be transmitted to the main controller 200, the information as to where each of the carriage carts CC is located at any portion in the cart passageway with the lapse of time can be approximately grasped by the main controller 200 Therefore, it is possible to display this information, after it is converted into a display information, on the screen of the display device 208, thus making it possible to find out the generation of any abnormal situation.

Figure 28:
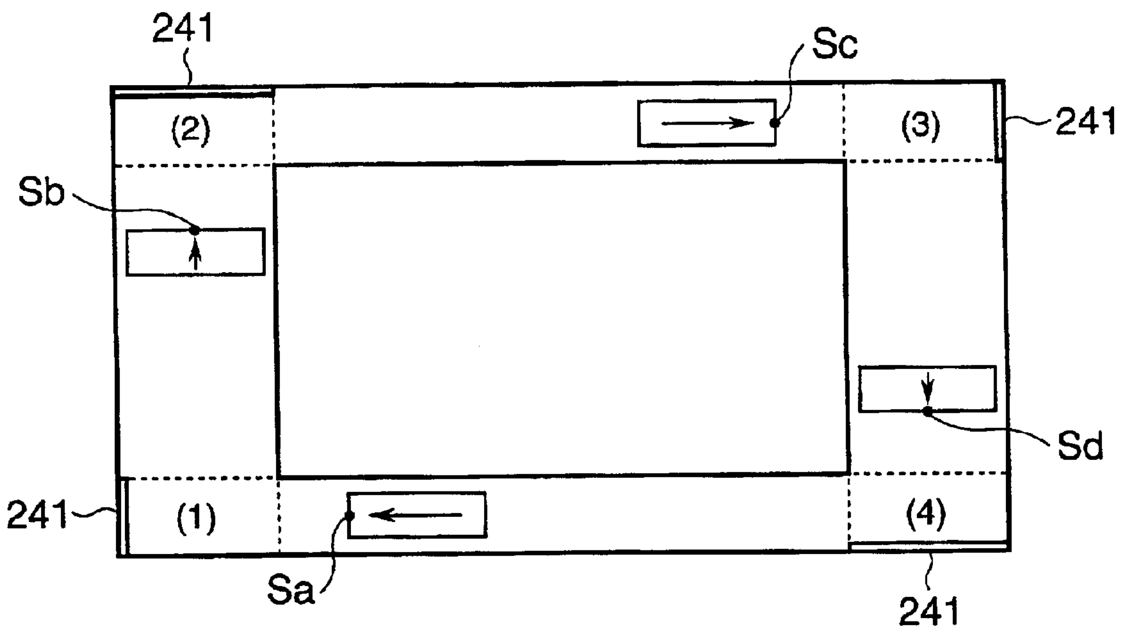
FIG. 28 is a schematic view illustrating the manner of recognizing whether each carriage cart is reached to four corner portion of the entire transfer line of the carriage cart CC shown in FIG. 21.

FIG. 28 illustrates the manner of recognizing the reaching of each carriage cart CC to a corner portion. Each carriage cart CC is allowed to advance in the direction of the arrow along four cart-transferring passageways. In this embodiment, four proximity switches Sa, Sb, Sc and Sd are respectively attached to the central portion of each of four side walls of the trestle 140 (see FIG. 19) of the carriage cart CC. The proximity switch Sa is designed to detect a metallic surface 241 which is attached to such a place which faces the advancing direction the carriage cart CC so as to make it possible to recognize the arrival of the carriage cart CC at the corner portion (1). Likewise, the proximity switch Sb is designed to detect the arrival of the carriage cart CC at the corner portion (2); the proximity switch Sc is designed to detect the arrival of the carriage cart CC at the corner portion (3); and the proximity switch Sd is designed to detect the arrival of the carriage cart CC at the corner portion (4).

Figure 29:
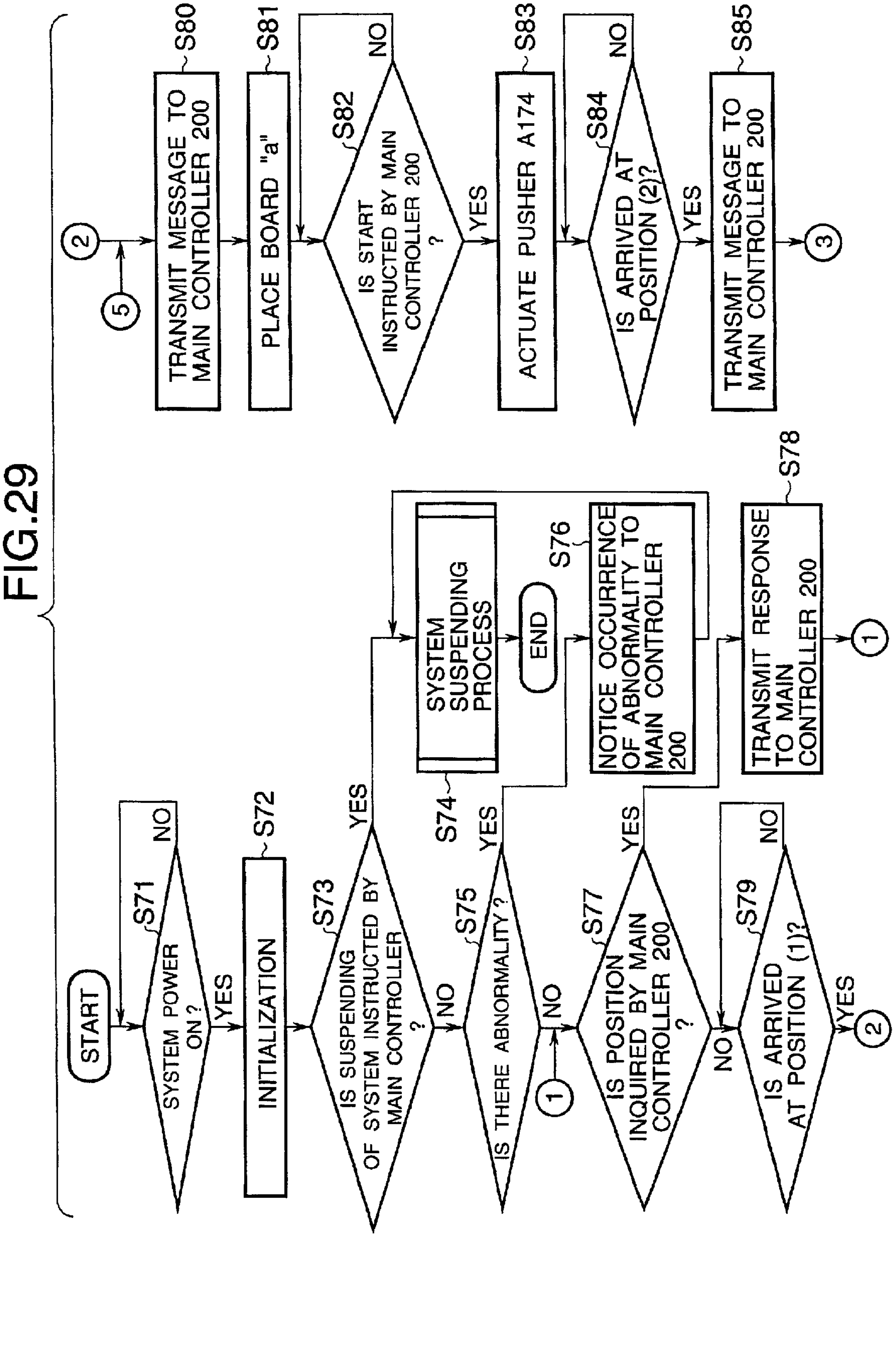
FIG. 29 is a flow chart (No. 1) for explaining the control operation of the cart controller shown in FIG. 27.
Figure 30:
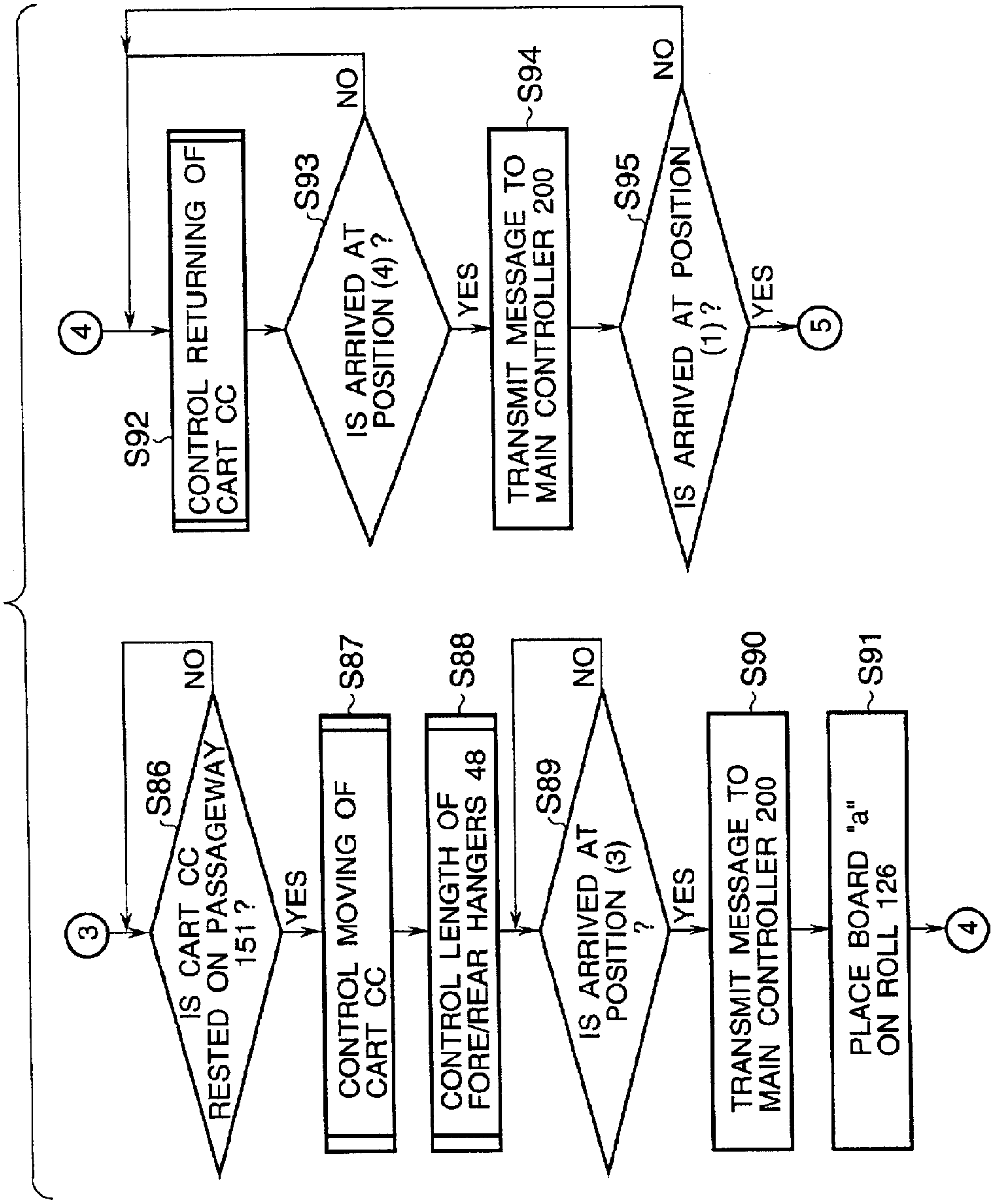
FIG. 30 is a continuation of a flow chart (No. 2) shown in FIG. 29.

FIGS. 29 and 30 respectively shows a flow chart for explaining the operation of the cart controller 210 in this second embodiment. First of all, it is determined if the system power source is ON (step S71). If the answer is NO, the procedure is brought into a state of standby until the system power source is turned ON. If the answer YES, the initialization of the system including the radio communication set-up in relative to the main controller 200 is performed (step S72).

In the next step S73, it is determined as to if there is an instruction of suspending the system from the main controller 200. If the answer is YES, the system suspending process is performed (step S74), and finishes the flow. If the answer is NO, it is determined as to if there is any abnormality in the system itself (step S75). If the answer is YES, the generation of abnormality is notified to the main controller 200 (step S76), and then, the procedure is advanced to the step S74. If the answer is NO, a judgment is made as to if there has been an inquiry on the position from the main controller 200 (step S77). If the answer is YES, a response message on the positional information is transmitted to the main controller 200 (step S78), and then, the procedure is advanced to the step S77. If the answer is YES, a determination is made as to if the carriage cart has reached the position (1) (step S79). If the answer is NO and the carriage cart has not yet reached the position (1), the procedure is brought into a state of standby until the carriage cart reaches the position (1). If the answer is YES, a message of the arrival of the carriage cart is transmitted to the main controller 200 (step S80), and a work board is placed in position (step S81). Thereafter, it is determined as to if there is an instruction to start the work board from the main controller 200 (step S82). If the answer is NO, the procedure is brought into a state of standby until an instruction to start the work board is made. If the answer YES, the pusher A174 is actuated, thereby mounting the carriage cart on the chain conveyor 172 (step S83). Next, a determination is made as to if the carriage cart has reached the position (2) (step S84). If the answer is NO and the carriage cart has not yet reached the position (2), the procedure is brought into a state of standby until the carriage cart reaches the position (2). If the answer is YES, a message of the arrival of the carriage cart at the position (2) is transmitted to the main controller 200 (step S85), and the procedure is advanced to the steps shown in FIG. 30.

Next, referring to FIG. 30, it is determined as to if the carriage cart CC has been rested on the plane transferring passageway 151 (step S86). If the answer is NO, the procedure is brought into a state of standby until the carriage cart CC is rested on the plane transferring passageway 151. If the answer is YES, the controlling of moving of the carriage cart CC is performed (step S87) and at the same time, the length of the fore and rear hangers 148 is controlled (step S88). Further, a determination is made as to if the carriage cart CC has reached the position (3) (step S89). If the answer is NO, the procedure is brought into a state of standby until the carriage cart reaches the position (3). If the answer is YES, a message of the arrival of the carriage cart at the position (3) is transmitted to the main controller 200 (step S90), and the board "a" is placed on the transferring roll 126 (step S91). Thereafter, the return transferring and return moving of the carriage cart CC are controlled (step S92), and then, a determination is made as to if the carriage cart CC has reached the position (4) (step S93). If the answer is NO, the controlling of the return transferring and return moving of the carriage cart CC is continued (step S92). If the answer is YES, a message of the arrival of the carriage cart at the position (4) is transmitted to the main controller 200 (step S94). Further, a determination is made as to if the carriage cart CC has reached the position (1) (step S95). If the answer is NO, the controlling of the return transferring and return moving of the carriage cart CC is continued (step S92). If the answer is YES, the procedure is returned to the step S80 (FIG. 29).

Figure 31:
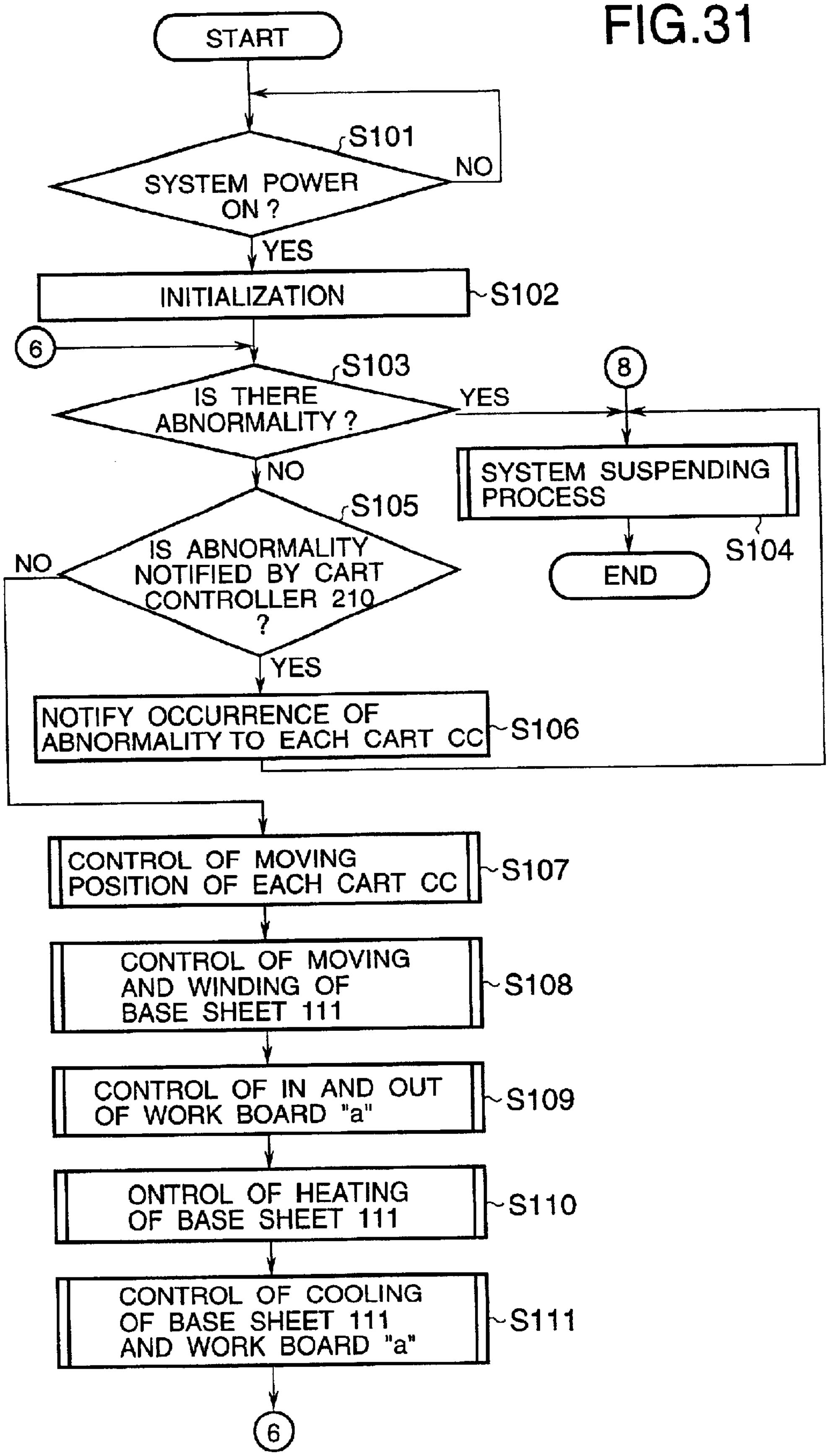
FIG. 31 is a flow chart for explaining the control operation of the main controller shown in FIG. 27.

FIG. 31 is a flow chart for explaining the operation of the main controller 200 in this second embodiment. In this case, the details of each specific controlling item are designed to be performed by each controller which is exclusively assigned for that purpose. Therefore, the main controller 200 is mainly designed to give an appropriate instruction to each of these controllers.

First of all, it is determined if the system power source is ON (step S101). If the answer is NO, the procedure is brought into a state of standby until the system power source is turned ON. If the answer is YES, the initialization of the system including the radio communication set-up in relative to each cart controller 210 is performed (step S102).

In the next step S103, it is determined as to if there is any abnormality in the system itself. If the answer is YES, a system suspending process is performed (step S104), thereby finishing the flow. If the answer is NO, a judgment is made as to if there has been a notification of the generation of abnormality from the cart controller 210 (step S105). If the answer is YES, this abnormality is notified, through a broadcast communication, to the cart controller 210 of each carriage cart CC (step S106), and then, the procedure is advanced to the step S104. If the answer is NO, the controlling of the moving position of each carriage cart CC (step S107), the controlling of the moving and winding-up of the base sheet 111 (step S108), the controlling of the introduction and delivery of the work board "a" (step S109), the controlling of the heating of the base sheet 111 (step S110), and the controlling of the cooling of the base sheet 111 and the work board "a" (step S111) are successively performed, thereafter, the procedure being returned to the step 103.

Next, the process to control the moving position of each carriage cart CC (step S107) will be explained in detail with reference to FIGS. 32 and 33.

In the step of controlling the moving and winding-up of the base sheet 111 (step S108), a synchronous operation of the pin tenter 116 and the residual base sheet roll 117 will be instructed.

In the step of controlling the introduction and delivery of the work board "a" (step S109), a timing operation of the board-introducing chain conveyor 172 and the board-delivering chain conveyor 176 will be instructed. Additionally, according to the detection of the base sheet 111 by means of the color mark sensor 205, the cart controller 210 of the carriage cart CC which is positioned at the start position (1) is instructed to start the carriage cart CC.

In the step of controlling the heating of the base sheet 111 (step S110), according to the detection of the base sheet 111 by means of the color mark sensor 205, the sheet temperature controller 188 is instructed to start or stop the heating. This sheet temperature controller 188 is designed such that by making use of the sheet surface thermometer 186, the temperature of the base sheet 111 immediately after it has been delivered out of the heating zone ZA is always measured, thereby making it possible to maintain the heating condition by means of a PID for instance, and to correct the heating condition, if required, by the time when the next PE-coating portion 132 is introduced therein.

In the step of controlling the cooling of the base sheet 111 and the work board "a" (step S111), the timing of the work board "a" to pass through the lamination zone ZB and the cooling zone ZD is notified. The cool air/exhaust controller 184 is designed such that the surface temperature of the object to be cooled at the outlet of each processing zone is measured so as to control the flow rate of the air blower 182 and the exhaust blower 183.

Figure 32:
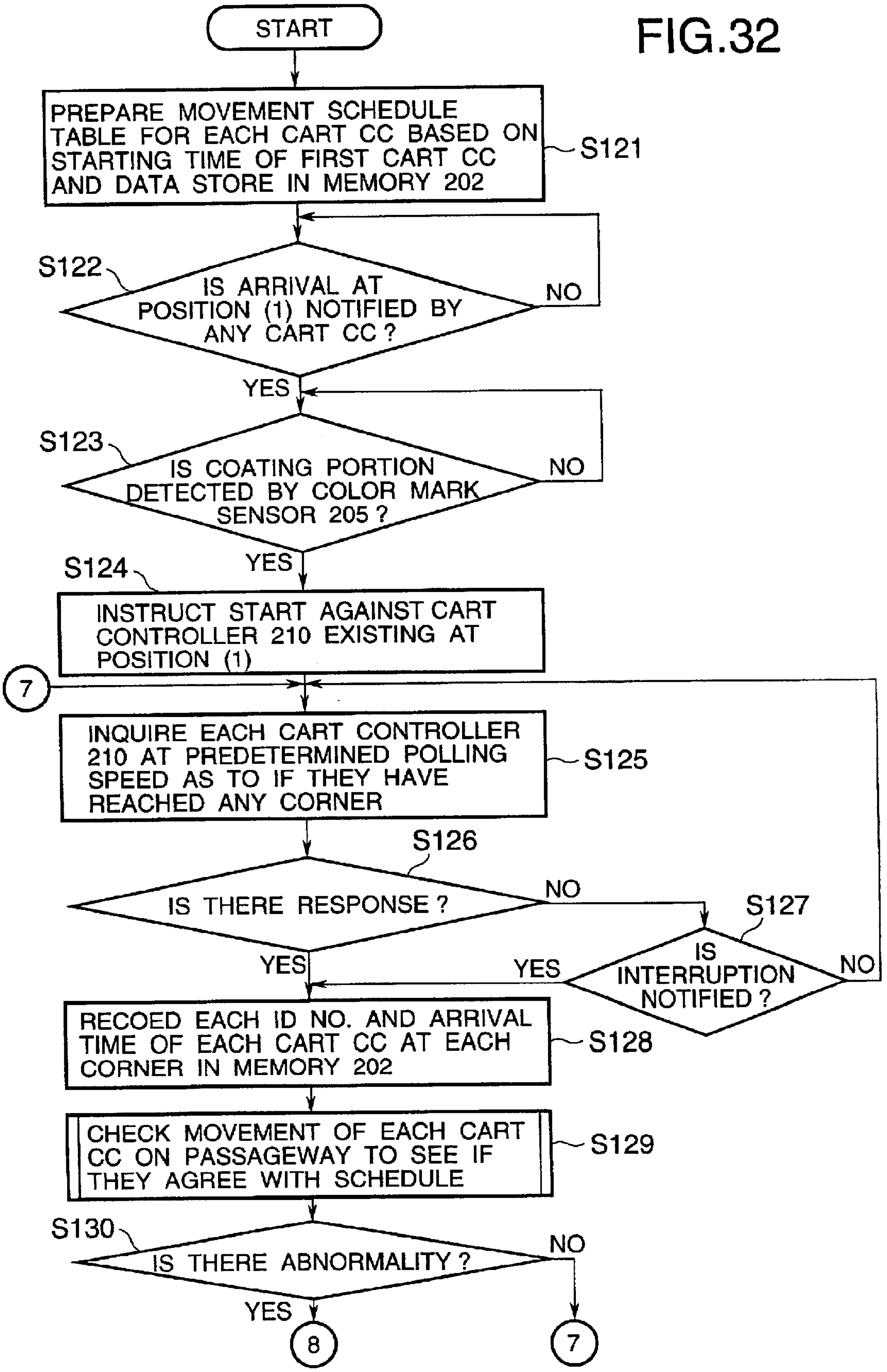
FIG. 32 is a flow chart for explaining the control operation in step S107.

FIG. 32 is a flow chart for explaining in detail the process to control the moving position of each carriage cart CC (step S107) in this second embodiment. First of all, based on the start time of the first carriage cart CC, the movement schedule of each carriage cart CC is prepared and is data stored in the memory 202 (step S121). Then, a determination is made as to if there has been a notification that any carriage cart CC has reached the position (1) (step S122). If the answer is NO, the procedure is brought into a state of standby until the arrival of the carriage cart CC is notified. If the answer is YES, a determination is made as to if the PE coating portion 132 has been detected by the color mark sensor 205 (step S123). If the answer is NO, the procedure is brought into a state of standby until the PE coating portion 132 is detected. If the answer is YES, the cart controller 210 which is positioned at the start position (1) is instructed to start (step S124). Thereafter, an inquiry asking if each carriage cart CC has reached any of the corner portions is made at a predetermined polling speed against each cart controller 210 (step S125). Then, it is determined if there is a response to this inquiry (step S126). If the answer is NO, it is determined if there is a notification of the interruption by any of the cart controller 210 (step S127). If the answer is NO, the procedure is returned to the step S125. If the answer in the step S126 or step S127 is YES, each ID number at each corner portion as well as the arrival time of each carriage cart CC are read out through a corresponding cart controller 210 and recorded in the memory 202 (step S128). Then, based on the recorded data, an examination is performed as to if each carriage cart CC is moving as scheduled on the moving passageway (step S129). A judgment is then made as to if there is any abnormality (step S130). If the answer is NO, the procedure is returned back to the step S125 so as to continue the procedure. If the answer is YES, the procedure is advanced to the step S104 (see FIG. 31) so as to suspend the system.

For the purpose of preventing the generation of the problem that the radio transmission from one of the cart controllers 210 to the main controller 200 may be overlapped with the radio transmission from another of the cart controllers 210 to the main controller 200 due to a simultaneous arrival of a plurality of carriage carts CC at two or more corner portions (at most, four corner portions), this second embodiment is designed such that an access is made at a predetermined polling speed from the main controller 200 against each cart controllers 210 so as to inquire the arrival time of each carriage cart CC at each corner portion.

In response to this inquiry, each cart controller 210 sends response messages on the information of the arrival (when the information is not yet notified), i.e. "the ID number thereof", "the arrival time thereof at the corner that has been passed through just before", and "the corner number", to the main controller 200.

If a notifying message saying that the carriage cart CC has arrived at a corner portion is directly transmitted from any one of the cart controllers 210 to the main controller 200 during the aforementioned inquiries by means of the polling, the main controller 200 accepts this notifying message as an interrupting input data.

The notifying message to be notified by each carriage cart CC in this case may be confined to "the ID number thereof", "the arrival time thereof at the corner, and "the corner number".

If the measurement data on the elapsed time starting from the arrival time of each corner portion is included in the notifying message to be supplied from the carriage cart CC, it becomes possible to grasp the rough present location on the transferring/moving passageway of each carriage cart CC.

The aforementioned response message and notifying message can be distinguished from each other by attaching a flag for instance to the response message data.

The examination at the step S129 can be performed by checking "whether or not the carriage cart CC has arrived, according to the predetermined movement schedule table, at the corner portion that has been notified as the corner portion that has been just passed through" in the case where the message recognized is a response message; or by checking "whether or not the carriage cart CC has arrived, according to the predetermined movement schedule table, at the corner portion that has been notified" in the case where the message utilized is a notifying message.

Specifically, the arrival time that has been notified is checked at first with reference to the scheduled arrival time shown in the movement schedule table. If the difference between these arrival times which is allowable in the light of the system operation, the notified arrival time is assumed as being OK. Then, a scheduled arrival time which is close to the notified arrival time is retrieved from the column of the same corner number in movement schedule table as that of the notified arrival time so as to see if the ID number of the retrieved scheduled arrival time agrees with the ID number that has been notified.

When it is determined that they do not agree with each other, it can be admitted that the carriage cart CC that has been notified or responded to the inquiry is not transferred or moving in conformity with that of the movement schedule, so that the next "system suspension process" is immediately executed.

In this system suspension procedure, the execution of system suspension procedure against each cart controller 210 is instructed by means of a multi-address radio communication. As for the system suspension procedure for other driving systems, an emergency shutdown is applied thereto. Thereafter, the system suspension procedure against the software is executed.

FIG. 33 shows one example of the table of the movement schedule, which is to be prepared in the step S121 (see FIG. 32) of the second embodiment. As mentioned above, each ID number at each corner portion and the scheduled arrival time of each carriage cart CC are set forth therein.

A Third Embodiment

Figure 34:
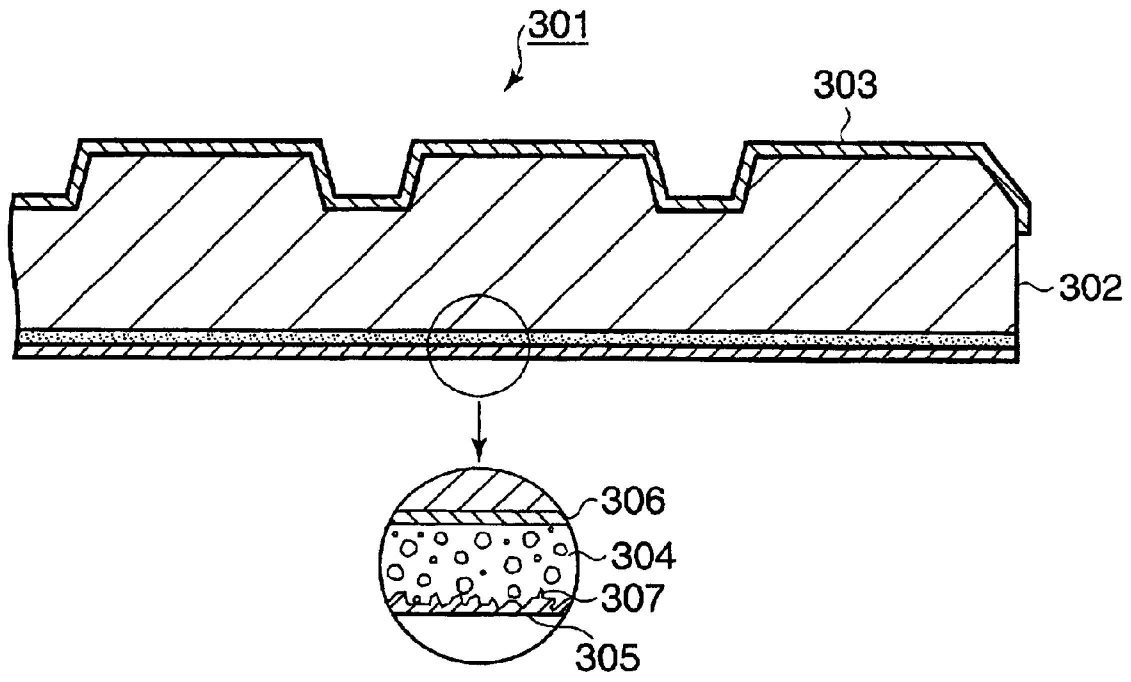
FIG. 34 is a partial cross-sectional view illustrating the construction of a building board according to the third embodiment.

FIG. 34 is a partial cross-sectional view illustrating the construction of a building board according a third embodiment of the present invention. The building board 301 is constructed such that a top coat layer 303 is formed on the front surface of a cement substrate 302, and a backing layer comprising a foamed plastic layer, preferably a PE (polyethylene) foam layer 304 and a non-foamed plastic layer, preferably a regenerated PET (polyethyleneterephthalate) sheet layer 305 is formed on the back surface of the cement substrate 302. The interface between these layers is not so clearly distinguished when it is viewed microscopically, i.e. the components of neighboring layers are fused with each other. Therefore, there may be existed therein a PE-impregnated layer 306 which is formed by the impregnation of foamed PE into the cement substrate 302, and a mixed layer 307 which is consisted of a mixture of foamed PE and regenerated PET.

The cement substrate 302 and the PE foam layer 304 may be the same as the cement substrate 102 and the PE foamed layer 104, respectively, in the second embodiment.

This regenerated PET sheet layer 305 is formed of a plastic sheet which can not be deformed as a whole even if it is heated up to a temperature higher than the foaming temperature of the PE foam layer 304. Namely, it is admissible even if this regenerated PET sheet layer 305 is formed of a plastic sheet which may be more or less softened so that the aforementioned mixed layer 307 which is consisted of a mixture of foamed PE and regenerated PET may be formed nearby.

Figure 35:
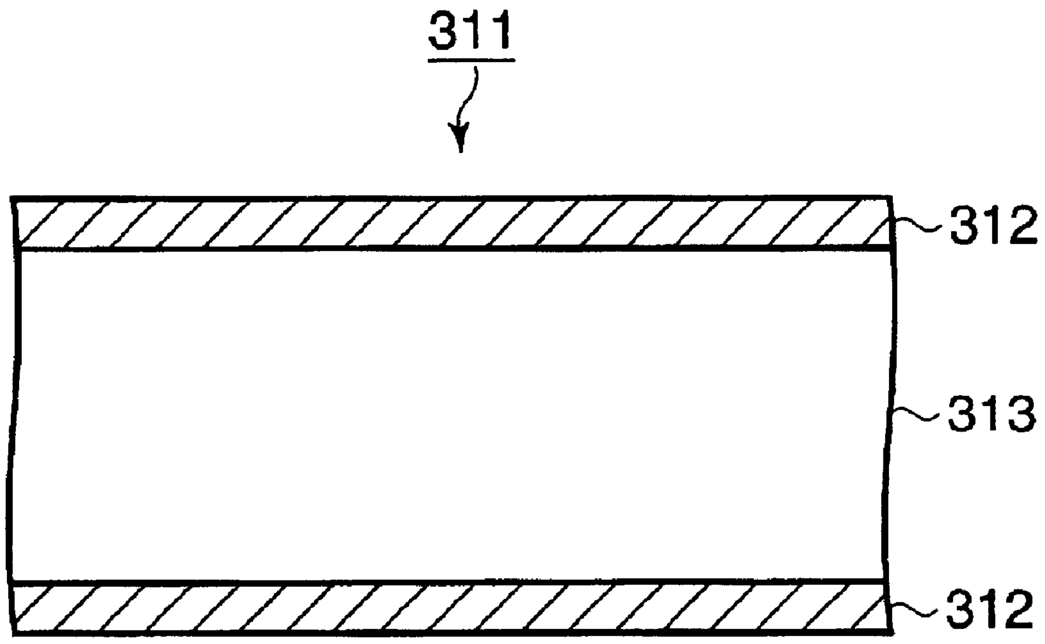
FIG. 35 is a partial top view for illustrating a laminate sheet to be employed in the third embodiment of the present invention.

FIG. 35 is a partial top view for illustrating a laminate sheet 311. This laminate sheet 311 is employed for backing the cement substrate 302, and is composed for example of a lengthy heat resistant regenerated PET sheet (unwoven fabric or woven fabric) 312, on the front surface of which an un-foamed PE layer 313 is coated in such a width which is narrower than that of the regenerated PET sheet 312 but wider than that of the cement substrate 302.

Figure 36:
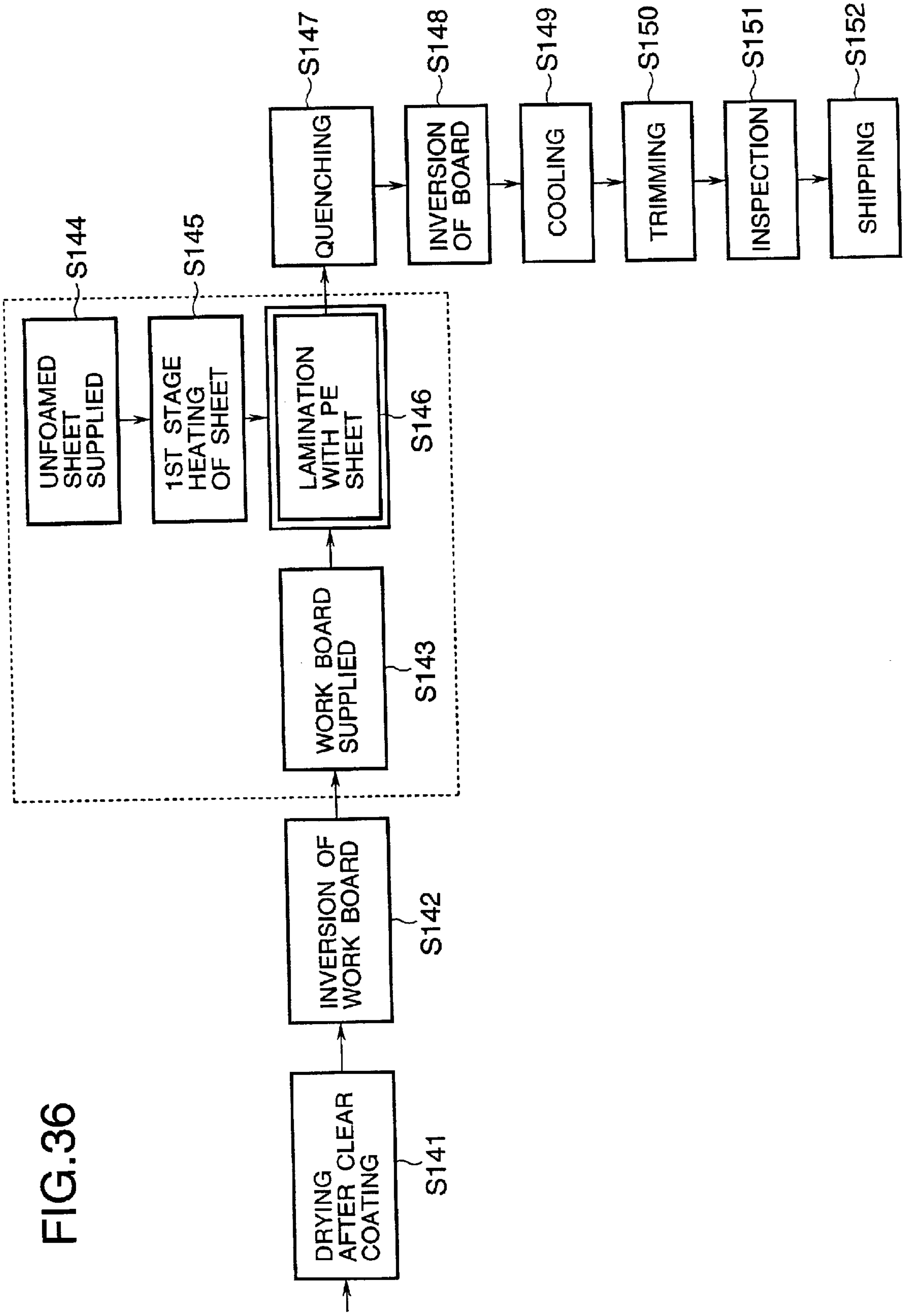
FIG. 36 is a flow chart for illustrating a back-working process of a laminate sheet using a building board-manufacturing apparatus according to the third embodiment.

FIG. 36 is a flow sheet for illustrating a back-working process of a laminate sheet using a building board-manufacturing apparatus according to this third embodiment. The region encircled by a broken line represents the process according to this third embodiment, which can be inserted into the conventional process. This third embodiment is featured in that the backing with a sealer is omitted, so that after being subjected to the drying step (step S141) following the clear coating by the ordinary building board-manufacturing apparatus, a work board "a" which is delivered with the front surface (designed surface) being turned upward is inverted at first (step S142), and then, the work board "a" is supplied in the line for subjecting it to a lamination process (step S143). On the other hand, a laminate sheet 311 having a coating of PE laminate layer 313 kept in an unfoamed state is fed (step S144). Thereafter, the laminate sheet 311 is subjected to a first stage heating treatment so as to heat, melt and foam the PE layer 313 (step S145), thereby allowing the laminate sheet 311 to be laminated on the work board "a" (step S146). Thereafter, this laminate sheet 311 is quenched (step S147) and the resultant work board "a" is allowed to advance so as to be inverted again (step S148), after which the work board "a" is transferred back to the process of the ordinary building board-manufacturing apparatus, including the cooling step (step S149), the trimming step (step S150) where a superfluous portion of the laminate sheet 311 which is protruded outside the outline of the work board "a" is cut off or trimmed, the inspection step (step S151) and the shipping step (step S152).

Figure 37:
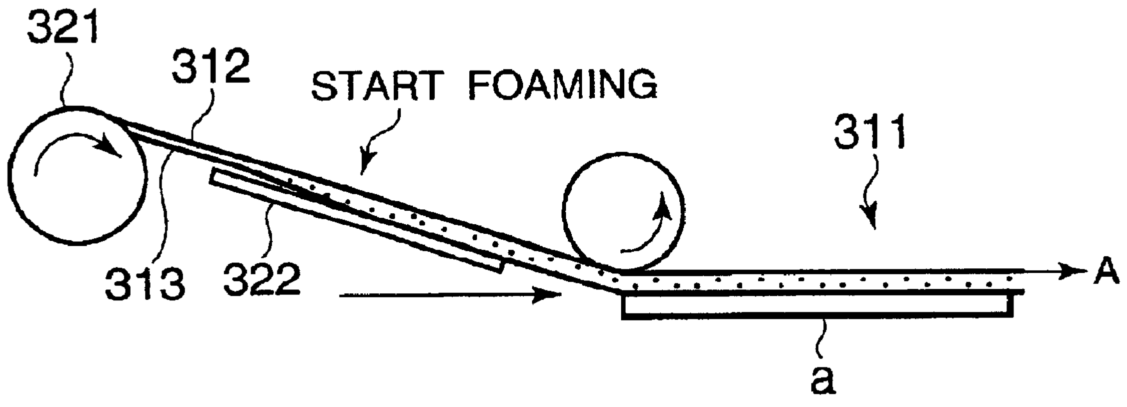
FIG. 37 is a side view for illustrating a manufacturing process for forming a polyethelene forming layer on the both surface of a building board.
Figure 38:
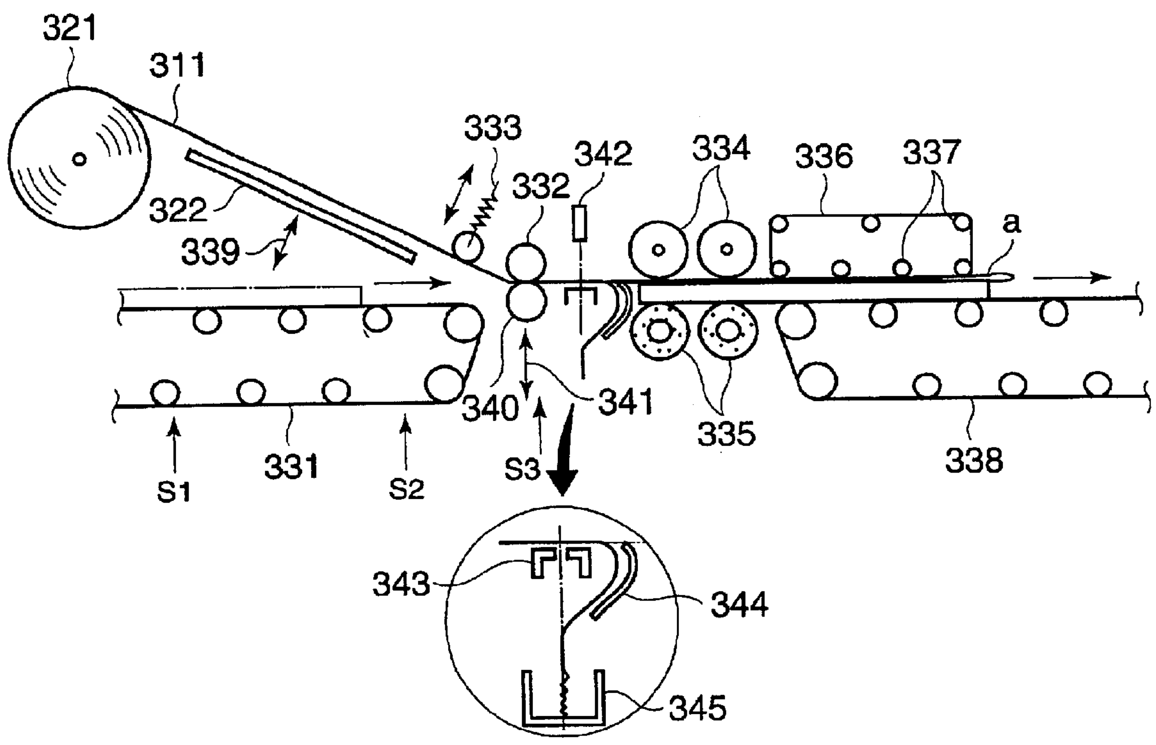
FIG. 38 is a side view illustrating the construction of a building board-manufacturing apparatus.

FIG. 37 illustrates a processing principle of a building board-manufacturing apparatus according to the third embodiment, and FIG. 38 illustrates the corresponding specific construction of this building board-manufacturing apparatus. In this case, the inverted work board "a" is mounted on the board-introducing conveyor 331 with the longitudinal direction of the work board "a" being directed toward the advancing direction A so as to transfer the work board "a" to the lamination processing zone.

Figure 39A:
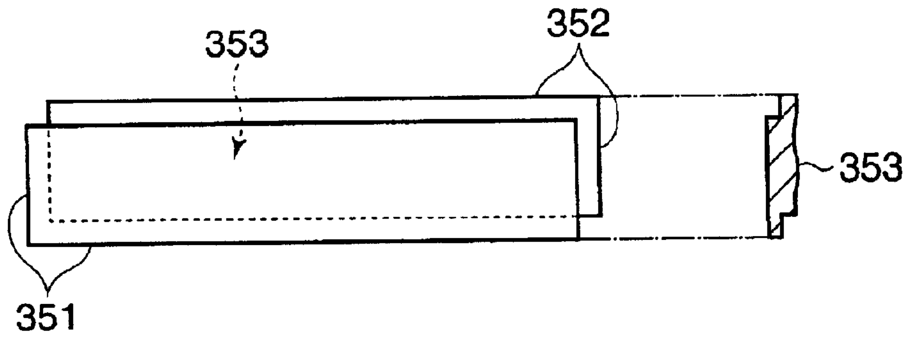
FIG. 39 shows views illustrating the relationship between a belt conveyor and a building board.
Figure 39B:
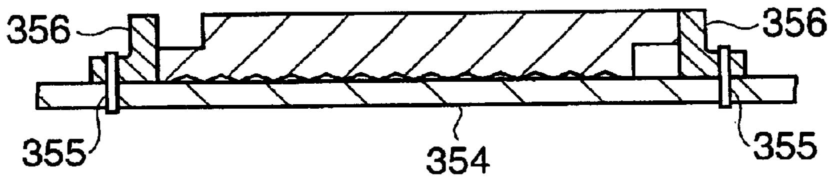
Figure 39C:
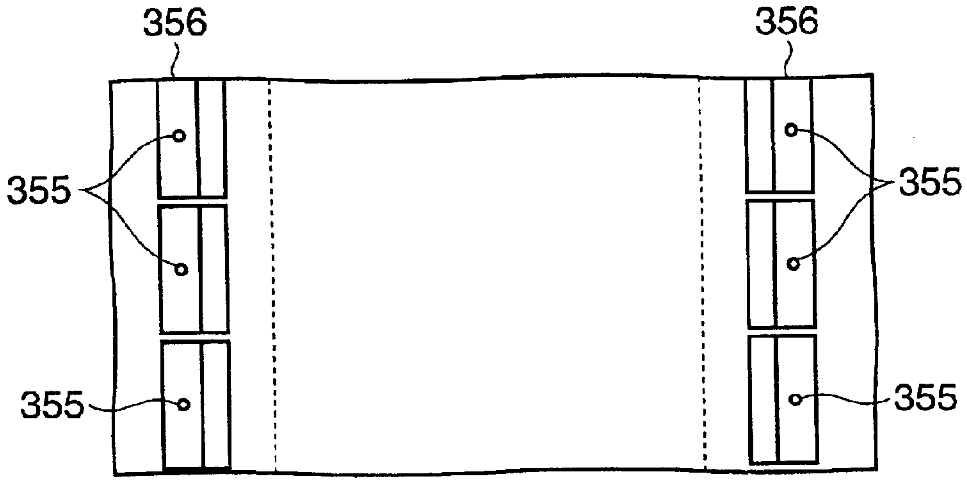

FIG. 39 illustrates a building board 301 and a belt conveyor 331 functioning as the board-introducing conveyor 331 and a board-delivering conveyor 338. FIG. 39(*a*) shows a plan view of the building board 301 when it is viewed from the back surface thereof, and also shows a side view thereof. The building board 301 is provided with a male tongue portion 351 and a female rabbet portion 352. Since the work board having a designed surface 353 which is prominent in projection and recess in the light of improving the design thereof is extensively employed in recent years, a belt conveyor is employed in place of the ordinary transferring roll. The work board "a" is designed to be introduced into the lamination processing zone in such a manner that the work board "a" is held between a large number of guide blocks 356 which are arranged on both side portions of the belt 354 of conveyor belt and fixed by means of fixing pins 355, with the back surface of the work board "a" being turned upward as shown in FIGS. 39(*b*) and 39(*c*) illustrating the side view and plan view of the work board "a", respectively.

On the other hand, the laminate sheet 311 (see FIG. 38) which is wound in the form of roll is delivered from a sheet roll 321, and under the condition where the regenerated PET sheet 312 (see FIG. 37) is turned upward and the un-foamed PE laminate layer 313 is turned downward, the surface of the PE laminate layer 313 is heated up to a first stage heating temperature by means of a far-infrared ray heater 322 which is disposed below the PE laminate layer 313, thereby causing the PE laminate layer 313 to melt. When the laminate sheet 311 is transferred to a position just before the lamination processing zone, the PE laminate layer 313 is caused to start the foaming thereof. The surface temperature of the laminate sheet 311 is increased for instance up to 175° C. at this moment. The introduction of the laminate sheet 311 into the lamination processing zone is performed by means of a feed roll 332, and the angle of introducing the laminate sheet 311 is designed to be adjusted by means of an adjuster-attached guide roll (preferably, consisting of a silicone rubber roll) 333.

In this lamination processing zone, the work board "a" that has been introduced is subjected at first to a feed-heat press working, in which the work board "a" is heated while being transferred by means of a heat press roll 334 and a back-up sponge roll 335 which is disposed below the heat press roll 334 so as to face the heat press roll 334. The back-up sponge roll 335 is formed of a heat-insulating sponge roll (elastic roll), and hence, it is capable of absorbing the projected and recessed surface of the work board "a", thereby making it possible to prevent the projected and recessed surface design from being collapsed and also to retain the heat possessed by the work board "a". Due to this heat treatment, the laminate sheet 311 is heated up to 200° C. for instance.

During this feed-heat press working, a PE-impregnated layer 306 (see FIG. 34) is caused to be formed by the impregnation of part of the laminate sheet 311 into the face region of the back surface of the work board "a". As a result of this impregnation, the adhesive strength of the laminate sheet 311 can be further improved. During this feed-heat press working, the foaming of the laminate sheet 311 is allowed to proceed microscopically, but since the laminate sheet 311 is pressurized, the foaming of the laminate sheet 311 is suppressed macroscopically. Namely, there is little possibility that the PE foam layer 304 increases its thickness more than required.

After finishing this pressing work, the expanded sheet is moved forward while being guided by an auxiliary heating Teflon-coat endless belt 336 which is disposed over the work board "a" with a clearance having a thickness corresponding to the predetermined thickness of the PE foam layer 304 being kept secured over the work board "a". The auxiliary heating by this auxiliary heating Teflon-coat endless belt 336 is effected in such a manner that the rear surface thereof is always contacted with the heat rolls 337 so as to maintain the surface temperature thereof at a temperature of 185° C. for instance, thereby making it possible to accomplish the PE expansion of the laminate sheet 311 by this auxiliary heating Teflon-coat endless belt 336.

The work board "a" after finishing the feed-heat press working is immediately mounted on the board-delivering conveyor 338 running below so as to be moved forward.

All of the feed roll 332, the heat press roll 334, the auxiliary heating Teflon-coat endless belt 336 and the board-delivering conveyor 338 are designed to be operated synchronously.

When the rear end of the work board "a" has passed through the feed roll 332, the far-infrared ray heater 322 is turned OFF, and at the same time, retracted back to a predetermined position by means of a heater-retracting mechanism 339.

Further, a sheet-holding roll-retracting mechanism 341 is provided in such a manner that the laminate sheet 311 can be held between a sheet-holding roll (for example, a silicone rubber roll) 340 and the feed roll 332 as the sheet-holding roll 340 is moved upward from its lower retracted position facing the feed roll 332 so as to be impinged against the feed roll 332.

At this moment where the laminate sheet 311 is held as mentioned above, the laminate sheet 311 is cut at a high speed at a laser-receiving stage 343 located close to and on the downstream side of the feed roll 332 by making use of a laser knife 342 (reciprocatively moved across the sheet portion). As a result, the laminate sheet 311 is cut obliquely. The work board "a" that has been laminated becomes a completely independent body at this moment.

This independent work board "a" is then transferred to the next cooling zone by means of the board-delivering conveyor 338. In this cooling zone, a cool air is blown against the back surface of the work board "a", and the cool air is subsequently sucked by means of ducts provided on both sides, thus executing the cooling treatment. Thereafter, the work board "a" is inverted again and placed on an ordinary transferring roll or chain conveyor with the top designed surface being directed upward, thus delivering the work board "a" out of this lamination zone so as to be moved to the next step.

Figure 40:
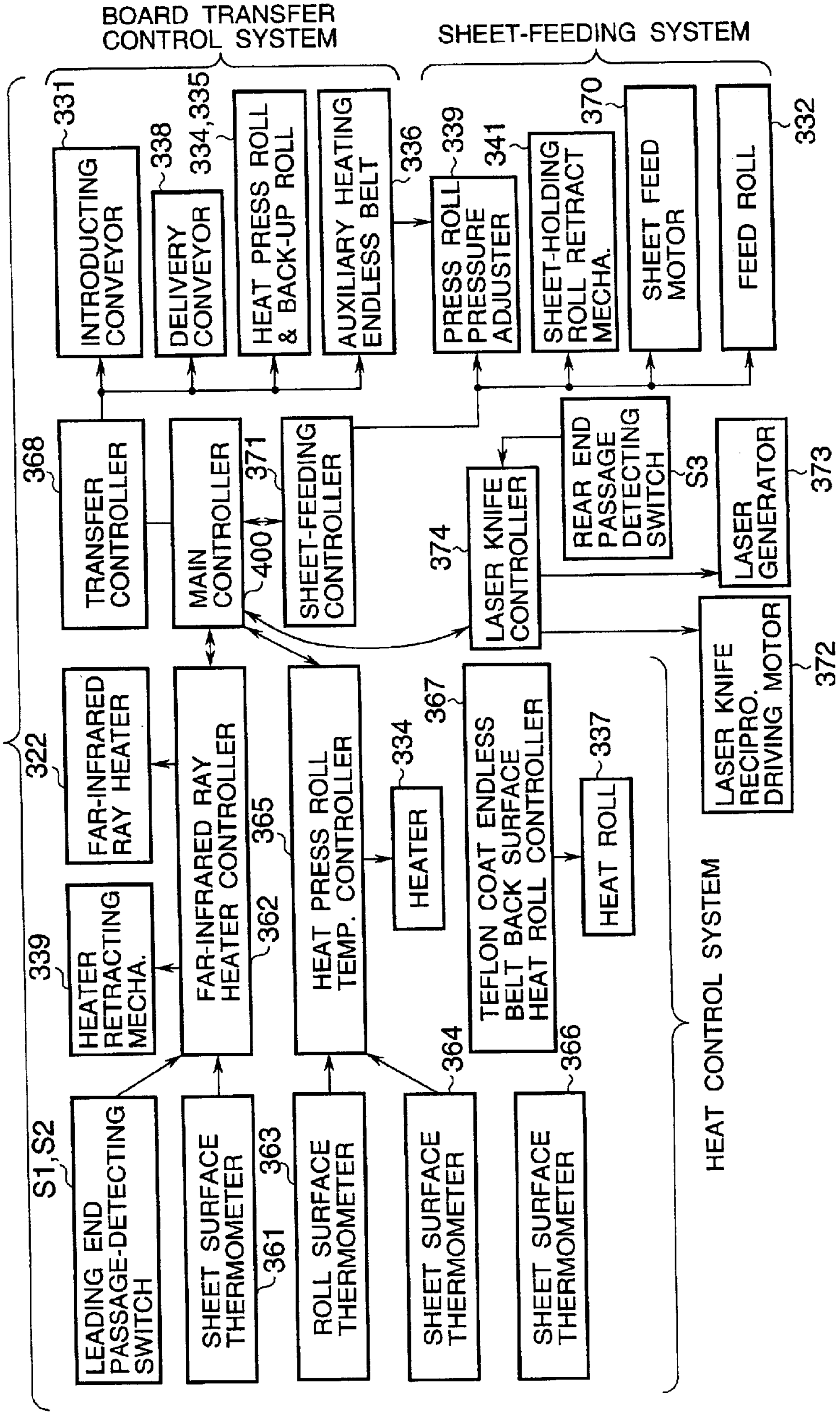
FIG. 40 is a block diagram illustrating the entire construction of a building board-manufacturing apparatus.

FIG. 40 illustrates the entire construction of a building board-manufacturing apparatus according to the third embodiment.

The main controller 400 is designed to control various members as follows. First of all, the passage of the leading end portion of the work board "a" is detected by passage-detecting switches S1 and S2, thereby controlling the heater-retracting mechanism 339. By making use of a sheet surface thermometer 361 for measuring the surface temperature of the laminate sheet 311 to be heated by the far-infrared ray heater 322 (see FIG. 38), a far-infrared ray heater controller 362 for controlling the far-infrared ray heater 322 is controlled. By making use of a sheet surface thermometer 363 for measuring the surface temperature of the heat press roll 334, and also by making use of a sheet surface thermometer 364 for measuring the surface temperature of the laminate sheet 311 to be heated by the heat press roll 334, a heat press roll temperature controller 365 for controlling the heating of the heat press roll 334 is controlled. By making use of a sheet surface thermometer 366 for measuring the surface temperature of the laminate sheet 311 to be heated by the heat roll 337, a Teflon coat endless belt back surface heat roll controller 367 for controlling the heating of the heat roll 337 is controlled. The system mentioned above is a system for controlling the heating.

A board transfer controller 368 is controlled so as to control the rotations of the board-introducing conveyor 331, the board-delivering conveyor 338, the heat press roll 334, the back-up sponge roll 335, and the auxiliary heating Teflon-coat endless belt 336. The system mentioned above is a system for controlling the transfer of work board.

A sheet-feeding controller 371 is controlled so as to control the press roll pressure adjuster 369 for adjusting the pressure of the heat press roll 334, a sheet-holding roll-retracting mechanism 341, the sheet feed motor 370 for rotating the sheet roll 321, and the feed roll 332. A laser knife controller 374 is controlled so as to control the laser knife reciprocative driving motor 372 which is capable of reciprocatively moving the laser knife upon detecting the complete introduction of the work board "a" into the laminating zone by means of a board rear end-passage detecting switch S3, and to control the laser generating device 373 for generating laser. These are sheet-feeding system.

Figure 41:
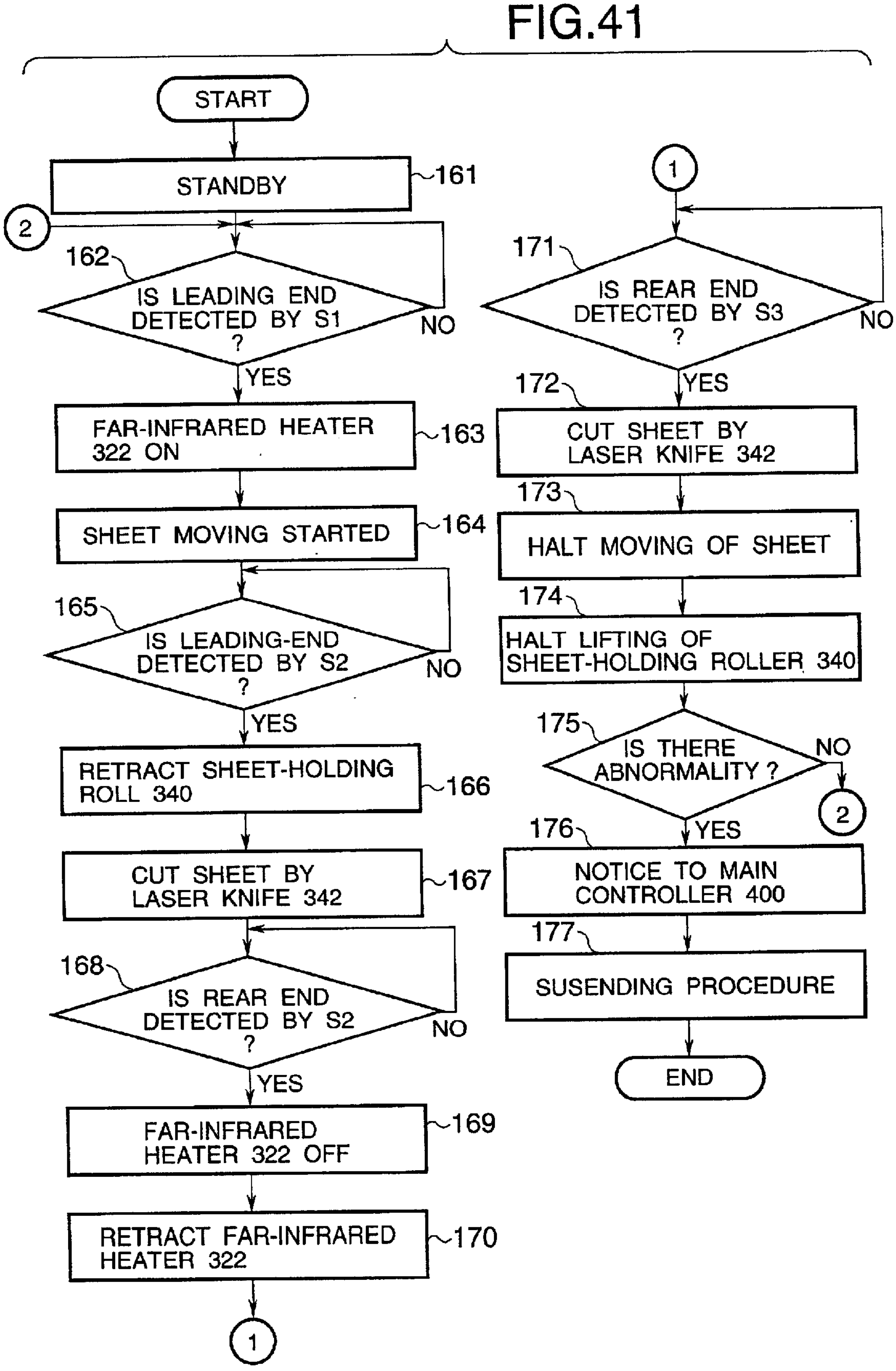
FIG. 41 is a flow chart for explaining the operation of the building board-manufacturing apparatus.

FIG. 41 is a flow chart for explaining the operation of the building board-manufacturing apparatus according to the third embodiment. First of all, the laminate sheet 311 is pulled out by an operator from the sheet roll 321. A leading end portion of the laminate sheet 311 is placed on the laser-receiving stage 343, and held between the sheet roll 332 and the sheet-holding roll 340 which is contacted with the roll 332. The angle of introducing the laminate sheet 311 can be adjusted by moving back and forth the adjuster-attached guide roll 333.

The angle of mounting the far-infrared ray heater 322 can be adjusted depending on the adjusted introducing angle of the laminate sheet 311, and the far-infrared ray heater 322 is brought into a state of standby while directing it to face the front surface of the laminate sheet 311 and positioning it at a predetermined position which is close to the laminate sheet 311 (the mechanism for the adjustment of angle and distance is not shown). The above procedures can be manually performed by an operator.

Further, the control of the rotation and heating of the heat press roll 334 and auxiliary heating Teflon-coat endless belt 336 is started.

Then, the operation of the board-introducing conveyor 331 and the board-delivering conveyor 338 in the board-transfer controlling system is started.

When the work board "a" is moved starting from its standby state (step S161) where the supply of laminate sheet 311 is available, and thereafter, the passage of the leading end of the work board "a" through a predetermined location on the board-introducing conveyor 331 is detected by the detection switch S1 (step S162), the far-infrared ray heater 322 is turned ON (step S163).

Simultaneously or a moment later, the rotation of the sheet feed motor 370 and the feed roll 332 is started (step S164). The leading end portion of the laminate sheet 311 is then introduced, along the a curved guide 344 disposed somewhat in front of the laser-receiving stage 343, into the underlying recovery basket 345, thereby enabling an unwanted sheet portion of the laminate sheet 311 to be recovered at the beginning of working.

When the passage of the leading end of the work board "a" through a predetermined location in the vicinity of the leading end portion of the board-introducing conveyor 331 is detected by the detection switch S2 (step S165), the sheet-holding roll 340 is retracted to a predetermined lower position (step S166).

Simultaneously, the laser knife 342 is moved to a facing position so at to cut off the laminate sheet 311 (step S167). (cutting of the leading end portion of the first sheet)

Then, the work board "a" is further pushed forward by means of the board-introducing conveyor 331, after which the work board "a" being held between the heat press roll 334 and the back-up sponge roll 335 is delivered forward. During these procedures, the foaming and laminating work is executed.

When the passage of the rear-end of the work board "a" through a predetermined location in the vicinity of the leading end portion of the board-introducing conveyor 331 is detected by the detection switch S2 (step S168), the far-infrared ray heater 322 is turned OFF (step S169), and at the same time, the far-infrared ray heater 322 is retracted back to a predetermined position (step S170).

When the passage of the rear-end of the work board "a" through a predetermined location in the vicinity before the heat press roll 334 is detected by the detection switch S3 (step S171), the laser knife 342 is moved back to the initial position so at to cut off the laminate sheet 311 (step S172). (cutting of the rear-end portion of the first sheet)

Then, the rotation of the sheet feed motor 370 and the feed roll 332 is halted (step S173).

Simultaneously, the sheet-holding roll 340 is moved upward from its lower retracted position so as to impinge it against the feed roll 332, thereby enabling the laminate sheet 311 to be held between these rolls (step S174).

If there is no abnormality during these procedures (step S175), the work board "a" is transferred forward so as to be subjected to the next step.

If an abnormality has been found, the fact is notified to the main controller 400 (step S176) so as to execute the suspension procedure, thus finishing the flow (step S177).

The present invention should not be construed as being limited by the aforementioned embodiments. For example, the backing can be performed using a lamination of a plurality of plastic sheets.

The following advantages can be obtained by the present invention.

(1) Since the impregnation of water from the back surface of building board can be effectively prevented, the change in dimension of board as a whole can be minimized.

(2) Since the impregnation of carbon dioxide from the back surface of building board can be substantially prevented, the carbonation or neutralization of the cement substrate can be effectively prevented.

(3) Since the impregnation of water from the back surface of building board can be effectively prevented, the exudation of chlorine ion from the interior of the building board can be prevented, so that the oxidization of iron (the generation of rust) can be prevented even if building board is fastened to an underlying steel construction.

(4) Since the membrane strength (tear strength, rupture strength, etc.) is higher as compared with the conventional sealer coating, the generation of scratch, crack, chipping (in particular, tongue and rabbet portions) can be inhibited.

(5) Since the coating step of a back sealer and the following drying step can be dispensed with, the energy cost involved can be greatly minimized. Further, the total cost for the coating can be greatly reduced.

(6) If a polyethylene sheet is employed as a backing material, the cost can be saved, and at the same time, even if it is burnt, the generation of smoke can be prevented, i.e. it will be merely melted, giving only water and carbon dioxide gas as combustion products, giving no harm.

(7) If a sheet having a patterned print (such as a grain pattern) is employed, it is possible to give an excellent design, thus making it advantageous when it is employed as a simple external wall.

(8) Even if this building board is fastened to an underlying steel construction, the generation of a noise of creak by the building board can be prevented due to the provision of a foamed layer or foamed plastics that is formed on the back surface of the building board.

(9) Even in the case where this building board is fastened to a framework by means of nailing, the protruded portion of nail can be protected by a foamed layer or foamed plastics having closed cells and excellent elasticity, so that rain water can be substantially prevented from passing through this protruded portion. As a result, the entering of rain water into the back side of building board can be effectively inhibited.

(10) Since a foamed layer or foamed plastics is formed on the back surface of the building board, it is possible to expect a shock absorption, so that even if an external force is applied to the building board, the cracking of building board into minute sections can be effectively inhibited.

(11) Since a foamed plastics and a non-foamed plastics are formed on the back surface of the building board, it is possible to obtain a product which is improved in strength.

What is claimed is:

1. A building board manufacturing apparatus for manufacturing building boards, each of said building boards comprising a cement substrate having a decorated surface and a plastic layer formed on a surface opposite the decorated surface, the apparatus comprising:

substrate heating means for pre-heating the cement substrate;

supplying means for continuously supplying a plastic sheet;

pressing means for pressing the plastic sheet against the surface opposite the decorated surface of the pre-heated cement substrate so as to thermally adhere the plastic sheet to the cement substrate by way of heat conduction;

transferring means for carrying cement substrates into the pressing means sequentially and for carrying each processed cement substrate including the plastic sheet out of the pressing means;

cooling means for quenching the processed cement substrate upon transfer from the pressing means; and a plastic sheet cutting assembly to cut a length of plastic sheet from the supplying means.

2. A building board manufacturing apparatus according to claim 1, wherein said substrate heating means comprises drying means for drying each cement substrate after application of a clear coating.

3. The building board manufacturing apparatus according to claim 1, wherein said supplying means supplies a plastic sheet from a sheet roll movably mounted on a rail that prevents meandering of the plastic sheet.

4. The building board manufacturing apparatus according to claim 1, wherein said transferring means comprises upper and lower endless belts.

5. A building board manufacturing apparatus for manufacturing building boards, each of said building boards comprising a cement substrate having a decorated surface and a plastic layer formed on a surface opposite the decorated surface, the apparatus comprising:

substrate heating means for pre-heating the cement substrate;

supplying means for continuously supplying a base sheet coated with plastic portions that are placed at predetermined intervals along the longitudinal direction of the base sheet, the plastic portions containing foaming agents that have not yet been foamed;

heating means for heating the plastic portion so that it can start to foam;

pressing means for pressing the plastic portion in a foaming state against the surface opposite the decorated surface of the pre-heated cement substrate, wherein the pressing means is disposed in a position subsequent to the heating means and the substrate heating means;

transferring means that suspends the cement substrate for placing the cement substrate so as to allow the surface opposite the decorated surface of the cement substrate to contact the plastic portion in a foaming state, and for transferring the cement substrate forward while preserving the contact;

cooling means for cooling the cement substrate after pressing; and a separator blade for separating each processed cement substrate from the base sheet.

6. The building board manufacturing apparatus according to claim 5, wherein said substrate heating means comprises drying means for drying each cement substrate after application of a clear coating.

7. The building board manufacturing apparatus according to claim 5, wherein said base sheet is coated with the plastic portions around the center of the sheet width.

8. A building board manufacturing apparatus for manufacturing building boards, each of said building boards comprising a cement substrate having a decorative surface and a plastic layer formed on a surface opposite the decorative surface, the plastic layer comprising a foamed layer and a non-expandable layer, the foamed layer bonded to the cement substrate, the apparatus comprising:

substrate heating means for pre-heating the cement substrate;

supplying means for continuously supplying a plastic sheet in tape-like form comprising an expandable layer and a non-expandable layer, the expandable layer containing a foaming agent that has not yet been foamed;

heating means for heating the expandable layer to initiate foaming;

pressing means for pressing the expandable layer in a foaming state against the surface opposite the decorated surface of the pre-heated cement substrate to form a foamed layer between the non-expandable layer and the cement substrate, wherein the pressing means is disposed in a position subsequent to the heating means and the substrate heating means;

transferring means for carrying each said cement substrate into the pressing means sequentially and for carrying each processed cement substrate out of the pressing means;

cooling means for cooling the cement substrate after pressing; and cutting means for cutting the plastic sheet in a length appropriate for each cement substrate.

9. The building board manufacturing apparatus according to claim 8, wherein said substrate heating means comprises drying means for drying each cement substrate after application of a clear coating.

10. The building board manufacturing apparatus according to claim 8, wherein the expandable layer has a sheet width which is narrower than that of the non-expandable layer but wider than that of the building board.

* * * * *